US010148801B2

(12) United States Patent
Jiang

(10) Patent No.: US 10,148,801 B2
(45) Date of Patent: Dec. 4, 2018

(54) METHOD AND APPARATUS FOR CONTROLLING MULTI-MICROPHONE NOISE-CANCELING SOUND PICKUP RANGE OF TERMINAL

(71) Applicant: Huawei Technologies Co., Ltd., Shenzhen (CN)

(72) Inventor: Kaiyu Jiang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/735,895

(22) PCT Filed: Mar. 9, 2016

(86) PCT No.: PCT/CN2016/075952
§ 371 (c)(1),
(2) Date: Dec. 12, 2017

(87) PCT Pub. No.: WO2017/067126
PCT Pub. Date: Apr. 27, 2017

(65) Prior Publication Data
US 2018/0213073 A1 Jul. 26, 2018

(30) Foreign Application Priority Data

Oct. 20, 2015 (CN) .......................... 2015 1 0689091

(51) Int. Cl.
*H04M 1/19* (2006.01)
*H04R 3/04* (2006.01)
(Continued)

(52) U.S. Cl.
CPC ........... *H04M 1/19* (2013.01); *G10L 21/0232* (2013.01); *H04M 1/72569* (2013.01);
(Continued)

(58) Field of Classification Search
CPC ...... H04M 1/19; H04M 9/08; H04M 2250/12; H04R 3/04; G10L 15/20; G10L 15/1815;
(Continued)

(56) References Cited

U.S. PATENT DOCUMENTS

2010/0103776 A1    4/2010 Chan
2013/0005413 A1*   1/2013 Brogle ................. G01D 5/2405
                                                    455/575.7
(Continued)

FOREIGN PATENT DOCUMENTS

CN    104335600 A    2/2015
CN    104618570 A    5/2015
(Continued)

OTHER PUBLICATIONS

Machine Translation and Abstract of International Publication No. WO2014044064, Mar. 27, 2014, 21 pages.
(Continued)

*Primary Examiner* — Khawar Iqbal
(74) *Attorney, Agent, or Firm* — Conley Rose, P.C.

(57) ABSTRACT

A method and an apparatus for controlling a multi-microphone noise-canceling sound pickup range of a terminal, and belongs to the field of terminal technologies, where the method includes transmitting a first non-voice signal, receiving a second non-voice signal that is obtained after the first non-voice signal is reflected by a reflecting object, determining, according to the first non-voice signal and the second non-voice signal, whether a posture with which a user holds a terminal during a call is a normal posture, and adjusting a multi-microphone noise-canceling sound pickup range of the terminal when the posture with which the user holds the terminal during the call is not a normal posture. Hence, accuracy of adjusting a multi-microphone noise-canceling sound pickup range of a terminal can be improved.

(Continued)

The apparatus includes a transmission module, a receiving module, a first determining module, and an adjustment module.

16 Claims, 16 Drawing Sheets

(51) Int. Cl.
   *H04R 1/40* (2006.01)
   *H04R 3/00* (2006.01)
   *H04M 1/725* (2006.01)
   *G10L 21/0232* (2013.01)
(52) U.S. Cl.
   CPC .............. *H04R 1/406* (2013.01); *H04R 3/005* (2013.01); *H04M 2250/12* (2013.01); *H04R 2499/11* (2013.01)
(58) Field of Classification Search
   CPC ................. G10L 17/06; G10L 21/0216; G10L 2021/02166
   See application file for complete search history.

(56) References Cited

U.S. PATENT DOCUMENTS

| | | | |
|---|---|---|---|
| 2014/0064506 A1* | 3/2014 | Ryu | H04M 1/6016 381/66 |
| 2014/0072133 A1 | 3/2014 | Nicholson | |
| 2014/0112502 A1* | 4/2014 | Lee | H04M 1/6008 381/122 |
| 2014/0270248 A1* | 9/2014 | Ivanov | H04R 3/005 381/92 |
| 2014/0302893 A1* | 10/2014 | Dhavaloganathan | H04M 1/72577 455/566 |
| 2015/0172811 A1 | 6/2015 | Sassi et al. | |
| 2015/0350395 A1 | 12/2015 | Jiang et al. | |
| 2016/0150399 A1* | 5/2016 | Zhang | H04W 8/22 455/418 |
| 2017/0025121 A1* | 1/2017 | Tang | G10L 15/20 |
| 2017/0238109 A1 | 8/2017 | Gong | |
| 2017/0278516 A1* | 9/2017 | Choi | H04M 1/271 |
| 2018/0136899 A1* | 5/2018 | Risberg | G06F 3/165 |

FOREIGN PATENT DOCUMENTS

| | | |
|---|---|---|
| WO | 2014044064 A1 | 3/2014 |
| WO | 2015131706 A1 | 9/2015 |
| WO | 2015154415 A1 | 10/2015 |

OTHER PUBLICATIONS

Foreign Communication From a Counterpart Application, European Application No. 16856573.7, Extended European Search Report dated Mar. 7, 2018, 8 pages.

Foreign Communication From a Counterpart Application, PCT Application No. PCT/CN2016/075952, English Translation of International Search Report dated Jul. 1, 2016, 2 pages.

* cited by examiner

METHOD AND APPARATUS FOR CONTROLLING MULTI-MICROPHONE NOISE-CANCELING SOUND PICKUP RANGE OF TERMINAL

CROSS-REFERENCE TO RELATED APPLICATIONS

This application is a U.S. National Stage of International Patent Application No. PCT/CN2016/075952 filed on Mar. 9, 2016, which claims priority to Chinese Patent Application No. 201510689091.9 filed on Oct. 20, 2015. Both of the aforementioned applications are hereby incorporated by reference in their entireties.

TECHNICAL FIELD

The present disclosure relates to the field of terminal technologies, and in particular, to a method and an apparatus for controlling a multi-microphone noise-canceling sound pickup range of a terminal.

BACKGROUND

To filter out noise from a voice that is transferred by a mobile phone to a peer user, most mobile phones have multiple microphones disposed, and multiple microphone input signals collected by the multiple microphones are processed by means of multi-microphone noise-canceling to obtain an uplink output signal. The multi-microphone noise-canceling is generally forming a sound pickup range having a specific geometric shape near a mobile phone, collecting an uplink user voice within the sound pickup range, and suppressing ambient noise out of the sound pickup range. For example, arrangement of a typical two-microphone solution is that one microphone is disposed near a top of a mobile phone, and is mainly configured to collect ambient noise. The other microphone is disposed at a bottom of the mobile phone, and collects a user voice including ambient noise. The mobile phone processes two microphone input signals by means of multi-microphone noise-canceling, eliminates the ambient noise in the user voice including ambient noise to obtain a relatively clear user voice, and transfers the user voice to a peer end.

From a perspective of whether a sound pickup range is fixed, multi-microphone noise-canceling may be classified into two types. An effect of a fixed sound pickup range is relatively stable. However, when a user's hand posture is abnormal, for example, when a mobile phone deviates from a user's face by a large angle, uplink silence, little sound, or poor quality may occur because a user's mouth deviates from the fixed sound pickup range. If a relatively large sound pickup range is merely set, an effect of filtering ambient noise is lessened. To better balance an uplink noise-canceling effect and adaptability of a user's hand posture, there are some multi-microphone noise-canceling solutions at present. In the solutions, a voice call frequency-band signal collected by a microphone is used to estimate a user's hand posture, and a multi-microphone noise-canceling sound pickup range of a mobile phone is controlled according to the estimated user's hand posture. In this way, ambient noise is filtered out, as much as possible, using a relatively small sound pickup range when a user's hand posture is normal, and obvious adverse impact on volume or voice quality of an uplink user voice is avoided by increasing a sound pickup range when a hand posture is abnormal.

In a process of implementing the present disclosure, the inventor finds that other approaches have at least the following problem.

Ambient noise easily affects estimation of a user's hand posture using a voice frequency-band signal. Consequently, accuracy of controlling a multi-microphone noise-canceling sound pickup range is low.

SUMMARY

To resolve a problem, the present disclosure provides a method and an apparatus for controlling a multi-microphone noise-canceling sound pickup range of a terminal. The technical solutions are as follows.

According to a first aspect, the present disclosure provides a method for controlling a multi-microphone noise-canceling sound pickup range of a terminal, where the method includes transmitting a first non-voice signal, receiving a second non-voice signal that is obtained after the first non-voice signal is reflected by a reflecting object, determining, according to the first non-voice signal and the second non-voice signal, whether a posture with which a user holds a terminal during a call is a normal posture, and adjusting a multi-microphone noise-canceling sound pickup range of the terminal if the posture with which the user holds the terminal during the call is not a normal posture.

With reference to the first aspect, in a first possible implementation manner of the first aspect, the first non-voice signal is a first infrared signal, and the second non-voice signal is a second infrared signal, and determining, according to the first non-voice signal and the second non-voice signal, whether a posture with which a user holds a terminal during a call is a normal posture includes obtaining first light intensity of the first infrared signal transmitted by a first optical proximity sensor on the terminal and second light intensity of the second infrared signal received by the first optical proximity sensor, calculating a first intensity difference between the second light intensity and the first light intensity, and determining, according to the first intensity difference, whether the posture with which the user holds the terminal during the call is a normal posture.

With reference to the first possible implementation manner of the first aspect, in a second possible implementation manner of the first aspect, determining, according to the first intensity difference, whether the posture with which the user holds the terminal during the call is a normal posture includes determining that the posture with which the user holds the terminal during the call is not a normal posture if the first intensity difference is greater than first preset intensity, or calculating a first distance between the first optical proximity sensor and the reflecting object according to the first intensity difference, and determining that the posture with which the user holds the terminal during the call is not a normal posture if the first distance is greater than a first preset distance.

With reference to the first possible implementation manner of the first aspect, in a third possible implementation manner of the first aspect, before determining, according to the first intensity difference, whether the posture with which the user holds the terminal is a normal posture, the method further includes obtaining third light intensity of a third infrared signal transmitted by a second optical proximity sensor on the terminal and fourth light intensity of a fourth infrared signal that is obtained after the third infrared signal is reflected by the reflecting object and that is received by the second optical proximity sensor, calculating a second intensity difference between the fourth light intensity and the third light intensity, determining that the posture with which the user holds the terminal during the call is not a normal posture if the second intensity difference is greater than second preset intensity, or performing the step of determining, according to the first intensity difference if the second intensity difference is not greater than the second preset intensity, whether the posture with which the user holds the terminal during the call is a normal posture.

With reference to the third possible implementation manner of the first aspect, in a fourth possible implementation manner of the first aspect, the method further includes calculating a first distance between the first optical proximity sensor and the reflecting object and a second distance between the second optical proximity sensor and the reflecting object respectively according to the first intensity difference and the second intensity difference, calculating an included angle between the terminal and the reflecting object according to the first distance, the second distance, and a third distance between the first optical proximity sensor and the second optical proximity sensor, and determining that the included angle is a valgus angle at which the user holds the terminal.

With reference to the first aspect, in a fifth possible implementation manner of the first aspect, the first non-voice signal is a first high-frequency ultrasonic signal, and the second non-voice signal is a second high-frequency ultrasonic signal, and determining, according to the first non-voice signal and the second non-voice signal, whether a posture with which a user holds a terminal during a call is a normal posture includes obtaining a first transfer function for the first high-frequency ultrasonic signal from an earpiece of the terminal to a first microphone according to the first high-frequency ultrasonic signal and the second high-frequency ultrasonic signal, and determining, according to the first transfer function, whether the posture with which the user holds the terminal during the call is a normal posture.

With reference to the fifth possible implementation manner of the first aspect, in a sixth possible implementation manner of the first aspect, determining, according to the first transfer function, whether the posture with which the user holds the terminal during the call is a normal posture includes calculating a first similarity between the first transfer function and a transfer function corresponding to a normal posture, and determining that the posture with which the user holds the terminal during the call is not a normal posture if the first similarity is less than a first preset similarity.

With reference to the fifth possible implementation manner of the first aspect, in a seventh possible implementation manner of the first aspect, determining, according to the first transfer function, whether the posture with which the user holds the terminal during the call is a normal posture includes obtaining at least one second transfer function for the first high-frequency ultrasonic signal from the earpiece of the terminal to at least one second microphone according to the first high-frequency ultrasonic signal and the second high-frequency ultrasonic signal, calculating a first similarity between the first transfer function and a transfer function corresponding to a normal posture, and a second similarity between each of the at least one second transfer function and the transfer function corresponding to the normal posture to obtain at least one second similarity, calculating a comprehensive similarity according to the first similarity and the at least one second similarity, and determining that the posture with which the user holds the terminal during the call is not a normal posture if the comprehensive similarity is less than a second preset similarity.

With reference to the fifth possible implementation manner of the first aspect, in an eighth possible implementation manner of the first aspect, the method further includes separately calculating a third similarity between the first transfer function and each transfer function in a transfer function set according to the first transfer function, where the transfer function set is used to store a transfer function corresponding to each valgus angle at which the user holds the terminal during the call, selecting a transfer function that has a largest third similarity with the first transfer function, and determining that a valgus angle corresponding to the selected transfer function is a valgus angle at which the user holds the terminal.

With reference to the fourth or the eighth possible implementation manner of the first aspect, in a ninth possible implementation manner of the first aspect, adjusting a multi-microphone noise-canceling sound pickup range of the terminal includes increasing the multi-microphone noise-canceling sound pickup range of the terminal, or obtaining a sound pickup range matching the valgus angle, and adjusting the multi-microphone noise-canceling sound pickup range of the terminal to the sound pickup range matching the valgus angle.

According to a second aspect, the present disclosure provides an apparatus for controlling a multi-microphone noise-canceling sound pickup range of a terminal, where the apparatus includes a transmission module configured to transmit a first non-voice signal, a receiving module configured to receive a second non-voice signal that is obtained after the first non-voice signal is reflected by a reflecting object, a first determining module configured to determine, according to the first non-voice signal and the second non-voice signal, whether a posture with which a user holds a terminal during a call is a normal posture, and an adjustment module configured to adjust a multi-microphone noise-canceling sound pickup range of the terminal if the posture with which the user holds the terminal during the call is not a normal posture.

With reference to the second aspect, in a first possible implementation manner of the second aspect, the first non-voice signal is a first infrared signal, and the second non-voice signal is a second infrared signal, and the first determining module includes a first obtaining unit configured to obtain first light intensity of the first infrared signal transmitted by a first optical proximity sensor on the terminal and second light intensity of the second infrared signal received by the first optical proximity sensor, a first calculation unit configured to calculate a first intensity difference between the second light intensity and the first light intensity, and a first determining unit configured to determine, according to the first intensity difference, whether the posture with which the user holds the terminal during the call is a normal posture.

With reference to the first possible implementation manner of the second aspect, in a second possible implementation manner of the second aspect, if the first intensity difference is greater than first preset intensity, the first determining unit is configured to determine that the posture with which the user holds the terminal during the call is not a normal posture, or calculate a first distance between the first optical proximity sensor and the reflecting object according to the first intensity difference, and determine that the posture with which the user holds the terminal during the call is not a normal posture if the first distance is greater than a first preset distance.

With reference to the first possible implementation manner of the second aspect, in a third possible implementation manner of the second aspect, the first determining module further includes a second obtaining unit configured to obtain third light intensity of a third infrared signal transmitted by a second optical proximity sensor on the terminal and fourth light intensity of a fourth infrared signal that is obtained after the third infrared signal is reflected by the reflecting object and that is received by the second optical proximity sensor, a first calculation unit configured to calculate a second intensity difference between the fourth light intensity and the third light intensity, and a second determining unit configured to determine that the posture with which the user holds the terminal during the call is not a normal posture if the second intensity difference is greater than second preset intensity, where if the second intensity difference is not greater than the second preset intensity, the first determining unit is executed to determine, according to the first intensity difference, whether the posture with which the user holds the terminal during the call is a normal posture.

With reference to the third possible implementation manner of the second aspect, in a fourth possible implementation manner of the second aspect, the apparatus further includes a first calculation module configured to calculate a first distance between the first optical proximity sensor and the reflecting object and a second distance between the second optical proximity sensor and the reflecting object respectively according to the first intensity difference and the second intensity difference, a second calculation module configured to calculate an included angle between the terminal and the reflecting object according to the first distance, the second distance, and a third distance between the first optical proximity sensor and the second optical proximity sensor, and a second determining module configured to determine that the included angle is a valgus angle at which the user holds the terminal.

With reference to the second aspect, in a fifth possible implementation manner of the second aspect, the first non-voice signal is a first high-frequency ultrasonic signal, and the second non-voice signal is a second high-frequency ultrasonic signal, and the first determining module includes a third obtaining unit configured to obtain a first transfer function for the first high-frequency ultrasonic signal from an earpiece of the terminal to a first microphone according to the first high-frequency ultrasonic signal and the second high-frequency ultrasonic signal, and a third determining unit configured to determine, according to the first transfer function, whether the posture with which the user holds the terminal during the call is a normal posture.

With reference to the fifth possible implementation manner of the second aspect, in a sixth possible implementation manner of the second aspect, the third determining unit includes a first calculation subunit configured to calculate a first similarity between the first transfer function and a transfer function corresponding to a normal posture, and a first determining subunit configured to determine that the posture with which the user holds the terminal during the call is not a normal posture if the first similarity is less than a first preset similarity.

With reference to the fifth possible implementation manner of the second aspect, in a seventh possible implementation manner of the second aspect, the third determining unit includes an obtaining subunit configured to obtain at least one second transfer function for the first high-frequency ultrasonic signal from the earpiece of the terminal to at least one second microphone according to the first high-frequency ultrasonic signal and the second high-frequency ultrasonic signal, a second calculation subunit configured to calculate a first similarity between the first transfer function and a transfer function corresponding to a normal posture, and a second similarity between each of the at least one second transfer function and the transfer function corresponding to the normal posture to obtain at least one second similarity, a third calculation subunit configured to calculate a comprehensive similarity according to the first similarity and the at least one second similarity, and a second determining subunit configured to determine that the posture with which the user holds the terminal during the call is not a normal posture if the comprehensive similarity is less than a second preset similarity.

With reference to the fifth possible implementation manner of the second aspect, in an eighth possible implementation manner of the second aspect, the apparatus further includes a third calculation module configured to separately calculate a third similarity between the first transfer function and each transfer function in a transfer function set according to the first transfer function, where the transfer function set is used to store a transfer function corresponding to each valgus angle at which the user holds the terminal during the call, a selection module configured to select a transfer function that has a largest third similarity with the first transfer function, and a third determining module configured to determine that a valgus angle corresponding to the selected transfer function is a valgus angle at which the user holds the terminal.

With reference to the fourth or the eighth possible implementation manner of the second aspect, in a ninth possible implementation manner of the second aspect, the adjustment module is configured to increase the multi-microphone noise-canceling sound pickup range of the terminal, or the adjustment module includes a fourth obtaining unit configured to obtain a sound pickup range matching the valgus angle, and an adjustment unit configured to adjust the multi-microphone noise-canceling sound pickup range of the terminal to the sound pickup range matching the valgus angle.

According to a third aspect, the present disclosure provides an apparatus for controlling a multi-microphone noise-canceling sound pickup range of a terminal, where the apparatus includes a transmitter, a receiver, and a processor, where the transmitter is configured to transmit a first non-voice signal. The receiver is configured to receive a second non-voice signal that is obtained after the first non-voice signal is reflected by a reflecting object. The processor is configured to determine, according to the first non-voice signal and the second non-voice signal, whether a posture with which a user holds a terminal during a call is a normal posture, and the processor is further configured to adjust a multi-microphone noise-canceling sound pickup range of the terminal if the posture with which the user holds the terminal during the call is not a normal posture.

With reference to the third aspect, in a first possible implementation manner of the third aspect, the first non-voice signal is a first infrared signal, and the second non-voice signal is a second infrared signal, and the processor is further configured to obtain first light intensity of the first infrared signal transmitted by a first optical proximity sensor on the terminal and second light intensity of the second infrared signal received by the first optical proximity sensor, calculate a first intensity difference between the second light intensity and the first light intensity, and determine, according to the first intensity difference, whether the posture with which the user holds the terminal during the call is a normal posture.

With reference to the first possible implementation manner of the third aspect, in a second possible implementation manner of the third aspect, the processor is further configured to determine that the posture with which the user holds the terminal during the call is not a normal posture if the first intensity difference is greater than first preset intensity, calculate a first distance between the first optical proximity sensor and the reflecting object according to the first intensity difference, and determine that the posture with which the user holds the terminal during the call is not a normal posture if the first distance is greater than a first preset distance.

With reference to the first possible implementation manner of the third aspect, in a third possible implementation manner of the third aspect, the processor is further configured to obtain third light intensity of a third infrared signal transmitted by a second optical proximity sensor on the terminal and fourth light intensity of a fourth infrared signal that is obtained after the third infrared signal is reflected by the reflecting object and that is received by the second optical proximity sensor. The processor is further configured to calculate a second intensity difference between the fourth light intensity and the third light intensity, and determine that the posture with which the user holds the terminal during the call is not a normal posture if the second intensity difference is greater than second preset intensity, or if the second intensity difference is not greater than the second preset intensity, the processor is further executed to determine, according to the first intensity difference, whether the posture with which the user holds the terminal during the call is a normal posture.

With reference to the third possible implementation manner of the third aspect, in a fourth possible implementation manner of the third aspect, the processor is further configured to calculate a first distance between the first optical proximity sensor and the reflecting object and a second distance between the second optical proximity sensor and the reflecting object respectively according to the first intensity difference and the second intensity difference, calculate an included angle between the terminal and the reflecting object according to the first distance, the second distance, and a third distance between the first optical proximity sensor and the second optical proximity sensor, and determine that the included angle is a valgus angle at which the user holds the terminal.

With reference to the third aspect, in a fifth possible implementation manner of the third aspect, the apparatus further includes a first microphone, the first non-voice signal is a first high-frequency ultrasonic signal, and the second non-voice signal is a second high-frequency ultrasonic signal, and the processor is further configured to obtain a first transfer function for the first high-frequency ultrasonic signal from an earpiece of the terminal to the first microphone according to the first high-frequency ultrasonic signal and the second high-frequency ultrasonic signal, and determine, according to the first transfer function, whether the posture with which the user holds the terminal during the call is a normal posture.

With reference to the fifth possible implementation manner of the third aspect, in a sixth possible implementation manner of the third aspect, the processor is further configured to calculate a first similarity between the first transfer function and a transfer function corresponding to a normal posture, and determine that the posture with which the user holds the terminal during the call is not a normal posture if the first similarity is less than a first preset similarity.

With reference to the fifth possible implementation manner of the third aspect, in a seventh possible implementation manner of the third aspect, the apparatus further includes at least one second microphone, and the processor is further configured to obtain at least one second transfer function for the first high-frequency ultrasonic signal from the earpiece of the terminal to the at least one second microphone according to the first high-frequency ultrasonic signal and the second high-frequency ultrasonic signal, calculate a first similarity between the first transfer function and a transfer function corresponding to a normal posture, and a second similarity between each of the at least one second transfer function and the transfer function corresponding to the normal posture to obtain at least one second similarity, calculate a comprehensive similarity according to the first similarity and the at least one second similarity, and determine that the posture with which the user holds the terminal during the call is not a normal posture if the comprehensive similarity is less than a second preset similarity.

With reference to the fifth possible implementation manner of the third aspect, in an eighth possible implementation manner of the third aspect, the processor is further configured to separately calculate a third similarity between the first transfer function and each transfer function in a transfer function set according to the first transfer function, where the transfer function set is used to store a transfer function corresponding to each valgus angle at which the user holds the terminal during the call, select a transfer function that has a largest third similarity with the first transfer function, and determine that a valgus angle corresponding to the selected transfer function is a valgus angle at which the user holds the terminal.

With reference to the fourth or the eighth possible implementation manner of the third aspect, in a ninth possible implementation manner of the third aspect, the processor is further configured to increase the multi-microphone noise-canceling sound pickup range of the terminal, or obtain a sound pickup range matching the valgus angle, and adjust the multi-microphone noise-canceling sound pickup range of the terminal to the sound pickup range matching the valgus angle.

According to a fourth aspect, the present disclosure provides a computer-readable storage medium for storing one or more programs, where the one or more programs include an instruction, and when the instruction is executed by a portable electronic device that includes multiple application programs, the portable electronic device is enabled to transmit a first non-voice signal, and receive a second non-voice signal that is obtained after the first non-voice signal is reflected by a reflecting object, determine, according to the first non-voice signal and the second non-voice signal, whether a posture with which a user holds a terminal during a call is a normal posture, and adjust a multi-microphone noise-canceling sound pickup range of the terminal if the posture with which the user holds the terminal during the call is not a normal posture.

With reference to the fourth aspect, in a first possible implementation manner of the fourth aspect, the first non-voice signal is a first infrared signal, and the second non-voice signal is a second infrared signal, and when the instruction is executed by the portable electronic device that includes multiple application programs, the portable electronic device is enabled to obtain first light intensity of the first infrared signal transmitted by a first optical proximity sensor on the terminal and second light intensity of the second infrared signal received by the first optical proximity sensor, calculate a first intensity difference between the second light intensity and the first light intensity, and determine, according to the first intensity difference, whether the posture with which the user holds the terminal during the call is a normal posture.

With reference to the first possible implementation manner of the fourth aspect, in a second possible implementation manner of the fourth aspect, when the instruction is executed by the portable electronic device that includes multiple application programs, the portable electronic device is enabled to determine that the posture with which the user holds the terminal during the call is not a normal posture if the first intensity difference is greater than first preset intensity, or calculate a first distance between the first optical proximity sensor and the reflecting object according to the first intensity difference, and determine that the posture with which the user holds the terminal during the call is not a normal posture if the first distance is greater than a first preset distance.

With reference to the first possible implementation manner of the fourth aspect, in a third possible implementation manner of the fourth aspect, when the instruction is executed by the portable electronic device that includes multiple application programs, the portable electronic device is enabled to obtain third light intensity of a third infrared signal transmitted by a second optical proximity sensor on the terminal and fourth light intensity of a fourth infrared signal that is obtained after the third infrared signal is reflected by the reflecting object and that is received by the second optical proximity sensor, calculate a second intensity difference between the fourth light intensity and the third light intensity, and determine that the posture with which the user holds the terminal during the call is not a normal posture if the second intensity difference is greater than second preset intensity, or perform the step of determining, according to the first intensity difference, whether the posture with which the user holds the terminal during the call is a normal posture if the second intensity difference is not greater than the second preset intensity.

With reference to the third possible implementation manner of the fourth aspect, in a fourth possible implementation manner of the fourth aspect, when the instruction is executed by the portable electronic device that includes multiple application programs, the portable electronic device is enabled to calculate a first distance between the first optical proximity sensor and the reflecting object and a second distance between the second optical proximity sensor and the reflecting object respectively according to the first intensity difference and the second intensity difference, calculate an included angle between the terminal and the reflecting object according to the first distance, the second distance, and a third distance between the first optical proximity sensor and the second optical proximity sensor, and determine that the included angle is a valgus angle at which the user holds the terminal.

With reference to the fourth aspect, in a fifth possible implementation manner of the fourth aspect, the first non-voice signal is a first high-frequency ultrasonic signal, and the second non-voice signal is a second high-frequency ultrasonic signal, and when the instruction is executed by the portable electronic device that includes multiple application programs, the portable electronic device is enabled to obtain a first transfer function for the first high-frequency ultrasonic signal from an earpiece of the terminal to a first microphone according to the first high-frequency ultrasonic signal and the second high-frequency ultrasonic signal, and determine, according to the first transfer function, whether the posture with which the user holds the terminal during the call is a normal posture.

With reference to the fifth possible implementation manner of the fourth aspect, in a sixth possible implementation manner of the fourth aspect, when the instruction is executed by the portable electronic device that includes multiple application programs, the portable electronic device is enabled to calculate a first similarity between the first transfer function and a transfer function corresponding to a normal posture, and determine that the posture with which the user holds the terminal during the call is not a normal posture if the first similarity is less than a first preset similarity.

With reference to the fifth possible implementation manner of the fourth aspect, in a seventh possible implementation manner of the fourth aspect, when the instruction is executed by the portable electronic device that includes multiple application programs, the portable electronic device is enabled to obtain at least one second transfer function for the first high-frequency ultrasonic signal from the earpiece of the terminal to at least one second microphone according to the first high-frequency ultrasonic signal and the second high-frequency ultrasonic signal, calculate a first similarity between the first transfer function and a transfer function corresponding to a normal posture, and a second similarity between each of the at least one second transfer function and the transfer function corresponding to the normal posture to obtain at least one second similarity, calculate a comprehensive similarity according to the first similarity and the at least one second similarity, and determine that the posture with which the user holds the terminal during the call is not a normal posture if the comprehensive similarity is less than a second preset similarity.

With reference to the fifth possible implementation manner of the fourth aspect, in an eighth possible implementation manner of the fourth aspect, when the instruction is executed by the portable electronic device that includes multiple application programs, the portable electronic device is enabled to separately calculate a third similarity between the first transfer function and each transfer function in a transfer function set according to the first transfer function, where the transfer function set is used to store a transfer function corresponding to each valgus angle at which the user holds the terminal during the call, select a transfer function that has a largest third similarity with the first transfer function, and determine that a valgus angle corresponding to the selected transfer function is a valgus angle at which the user holds the terminal during the call.

With reference to the fourth or the eighth possible implementation manner of the fourth aspect, in a ninth possible implementation manner of the fourth aspect, when the instruction is executed by the portable electronic device that includes multiple application programs, the portable electronic device is enabled to increase the multi-microphone noise-canceling sound pickup range of the terminal, or obtain a sound pickup range matching the valgus angle, and adjust the multi-microphone noise-canceling sound pickup range of the terminal to the sound pickup range matching the valgus angle.

According to embodiments of the present disclosure, a first non-voice signal is transmitted, and a second non-voice signal that is obtained after the first non-voice signal is reflected by a reflecting object is received, whether a posture with which a user holds a terminal during a call is a normal posture is determined according to the first non-voice signal and the second non-voice signal, and if the posture with which the user holds the terminal during the call is not a normal posture, a multi-microphone noise-canceling sound pickup range of the terminal is adjusted. In the present disclosure, the multi-microphone noise-canceling sound pickup range of the terminal is adjusted according to the non-voice signals. Therefore, the multi-microphone noise-canceling sound pickup range of the terminal is not affected by ambient noise, and accuracy of adjusting the multi-microphone noise-canceling sound pickup range of the terminal can be improved.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
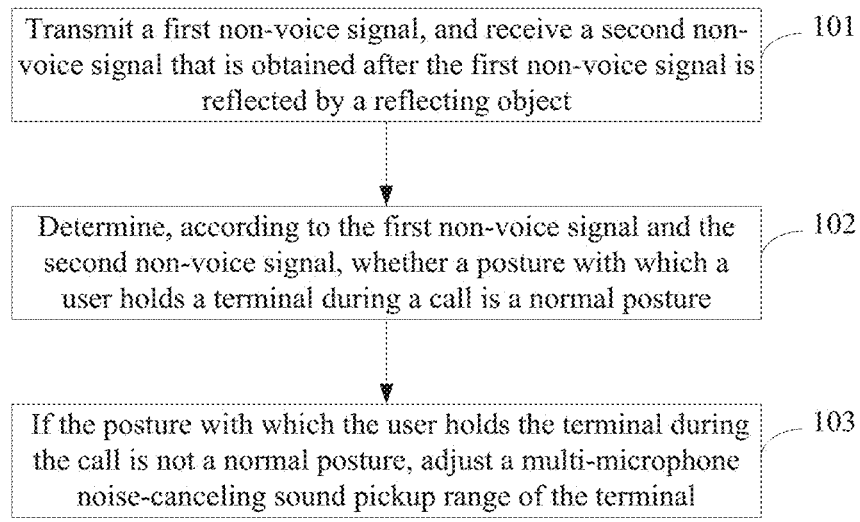
FIG. 1 is a flowchart of a method for controlling a multi-microphone noise-canceling sound pickup range of a terminal according to an embodiment of the present disclosure.

An embodiment of the present disclosure provides a method for controlling a multi-microphone noise-canceling sound pickup range of a terminal. The method is performed by a terminal. Referring to FIG. 1, the method includes the following steps.

Step 101: Transmit a first non-voice signal, and receive a second non-voice signal that is obtained after the first non-voice signal is reflected by a reflecting object.

Step 102: Determine, according to the first non-voice signal and the second non-voice signal, whether a posture with which a user holds the terminal during a call is a normal posture.

Step 103: If the posture with which the user holds the terminal during the call is not a normal posture, adjust a multi-microphone noise-canceling sound pickup range of the terminal.

According to this embodiment of the present disclosure, a first non-voice signal is transmitted, and a second non-voice signal that is obtained after the first non-voice signal is reflected by a reflecting object is received, whether a posture with which a user holds a terminal during a call is a normal posture is determined according to the first non-voice signal and the second non-voice signal, and if the posture with which the user holds the terminal during the call is not a normal posture, a multi-microphone noise-canceling sound pickup range of the terminal is adjusted. In the present disclosure, the multi-microphone noise-canceling sound pickup range of the terminal is adjusted according to the non-voice signals. Therefore, the multi-microphone noise-canceling sound pickup range of the terminal is not affected by ambient noise, and accuracy of adjusting the multi-microphone noise-canceling sound pickup range of the terminal can be improved.

Figure 2A:
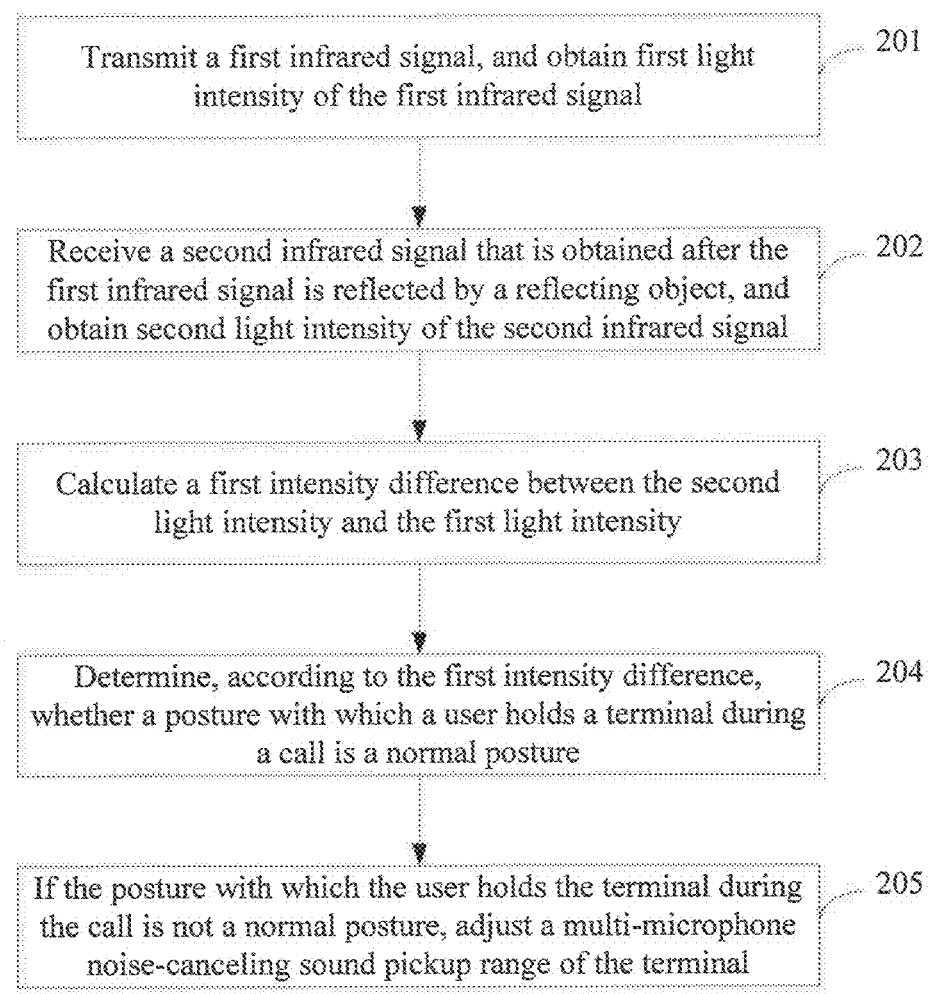
FIG. 2A is a flowchart of a method for controlling a multi-microphone noise-canceling sound pickup range of a terminal according to an embodiment of the present disclosure.

An embodiment of the present disclosure provides a method for controlling a multi-microphone noise-canceling sound pickup range of a terminal. The method is performed by a terminal. Referring to FIG. 2A, the method includes the following steps.

Step 201: Transmit a first infrared signal, and obtain first light intensity of the first infrared signal.

Figure 2B:
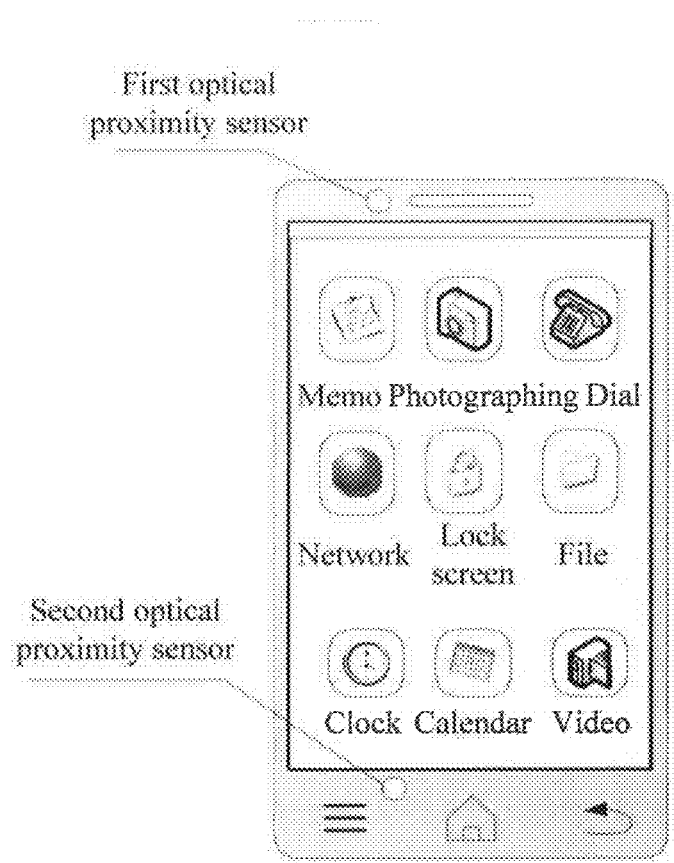
FIG. 2B is a schematic structural diagram of a terminal according to an embodiment of the present disclosure.
Figure 2C:
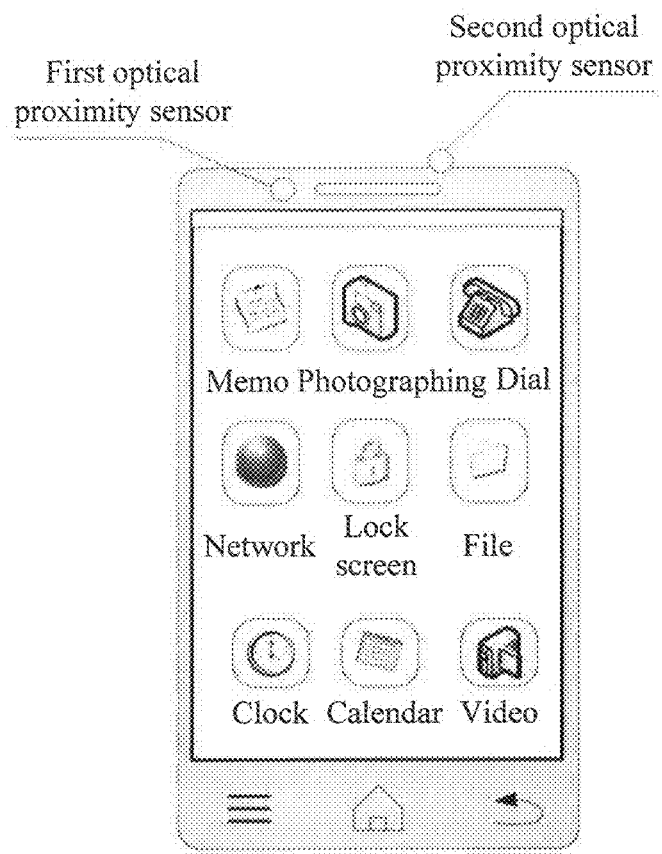
FIG. 2C is a schematic structural diagram of another terminal according to an embodiment of the present disclosure.

Referring to FIG. 2B, two optical proximity sensors are disposed on the terminal. For ease of description, the two optical proximity sensors are referred to as a first optical proximity sensor and a second optical proximity sensor, respectively. The first optical proximity sensor may be an existing optical proximity sensor, located beside an earpiece of the terminal, on the terminal. The second optical proximity sensor may be disposed on a front side of the terminal and below a terminal screen. Referring to FIG. 2C, the second optical proximity sensor may be alternatively disposed at a top of the terminal.

Further, to improve accuracy of controlling a multi-microphone noise-canceling sound pickup range of the terminal, the second optical proximity sensor may also be used to detect a posture with which a user holds the terminal during a call. Therefore, in this step, the second optical proximity sensor transmits a third infrared signal, and obtains third light intensity of the third infrared signal.

When making a call or answering a call, a user holds a terminal to approach a user's ear. Therefore, the first infrared signal transmitted by the first optical proximity sensor is reflected by a user's head, and the third infrared signal transmitted by the second optical proximity sensor may also be reflected by the user's head. For ease of description, an infrared signal that is obtained after the first infrared signal is reflected by the user's head is referred to as a second infrared signal, and an infrared signal that is obtained after the third infrared signal is reflected by the user's head is referred to as a fourth infrared signal. Then, step 202 is performed.

Step 202: Receive a second infrared signal that is obtained after the first infrared signal is reflected by a reflecting object, and obtain second light intensity of the second infrared signal.

Further, the second optical proximity sensor receives the fourth infrared signal, and obtains fourth light intensity of the fourth infrared signal.

When a user holds a terminal to approach the user's ear during a call, a reflecting object may be the user's head.

Step 203: Calculate a first intensity difference between the second light intensity and the first light intensity.

Further, if the second optical proximity sensor transmits the third infrared signal, and receives the fourth infrared signal that is obtained after the third infrared signal is reflected by the reflecting object, a second intensity difference between the fourth light intensity and the third light intensity may further need to be calculated in this step.

Step 204: Determine, according to the first intensity difference, whether a posture with which a user holds the terminal during a call is a normal posture.

Figure 2D:
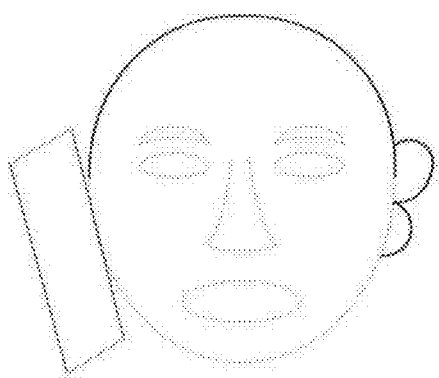
FIG. 2D is a schematic diagram of a user interface of a normal posture according to an embodiment of the present disclosure.

Referring to FIG. 2D, a normal posture features that an upper side of a terminal approaches a user's ear, and an included angle between a lower side of the terminal and a user's face is less than a preset angle.

This step may be implemented in a first manner, a second manner, a third manner, or a fourth manner. When the terminal uses only the first optical proximity sensor to detect the posture with which the user holds the terminal during the call, the following first manner or second manner may be used for implementation. When the terminal uses both the first optical proximity sensor and the second optical proximity sensor to detect the posture with which the user holds the terminal during the call, the following third manner or fourth manner may be used for implementation.

In the first implementation manner, this step may be determining whether the first intensity difference is greater than first preset intensity, and determining that the posture with which the user holds the terminal during the call is not a normal posture if the first intensity difference is greater than the first preset intensity, or determining that the first optical proximity sensor is relatively far from the reflecting object if the first intensity difference is greater than first preset intensity, that is, an upper side of the terminal that is held by the user does not approach the user's ear during the call, and thereby determining that the posture with which the user holds the terminal during the call is not a normal posture.

Figure 2E:
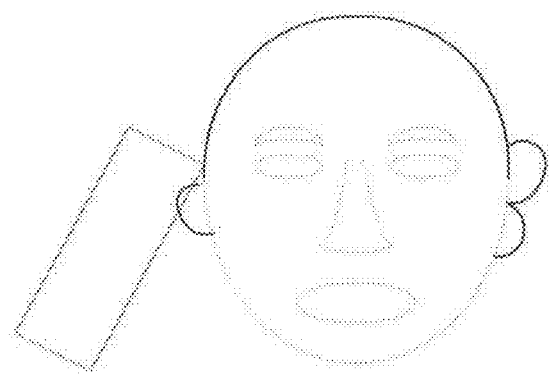
FIG. 2E is a schematic diagram of a user interface of a valgus posture according to an embodiment of the present disclosure.
Figure 2F:
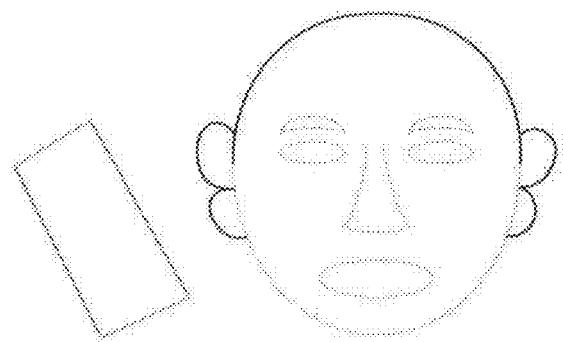
FIG. 2F is a schematic diagram of a user interface of an outward posture according to an embodiment of the present disclosure.

If a posture with which a user holds a terminal during a call is not a normal posture, the posture with which the user holds the terminal during the call may be a valgus posture, an outward posture, or the like. Referring to FIG. 2E, a valgus posture features that an upper side of a terminal that is held by a user approaches a user's ear during a call, and an included angle between a lower side of the terminal and a user's face is greater than a preset angle. Referring to FIG. 2F, an outward posture features that an upper side of a terminal that is held by a user does not approach a user's ear during a call, and an included angle between a lower side of the terminal and a user's face is greater than a preset angle.

The preset angle and the first preset intensity may be set or modified as required. In this embodiment of the present disclosure, no specific limitation is imposed on the preset angle and the first preset intensity.

In the second implementation manner, this step may be calculating a first distance between the first optical proximity sensor and the reflecting object according to the first intensity difference, and determining that the posture with which the user holds the terminal during the call is not a normal posture if the first distance is greater than a first preset distance, or obtaining, from a correspondence between an intensity difference and a distance according to the first intensity difference, a distance corresponding to the first intensity difference, and determining that the distance is a first distance between the first optical proximity sensor and the reflecting object, and determining that an upper side of the terminal that is held by the user does not approach the user's ear during the call if the first distance is greater than a first preset distance, and thereby determining that the posture with which the user holds the terminal during the call is not a normal posture.

The first preset distance may be set or modified as required. In this embodiment of the present disclosure, no specific limitation is imposed on the first preset distance. For example, the first preset distance may be 0.8 centimeter or 1 centimeter.

In the third implementation manner, when the second optical proximity sensor is disposed on the front side of the terminal and below the terminal screen, that both the first optical proximity sensor and the second optical proximity sensor are used to determine whether the posture with which the user holds the terminal during the call is a normal posture includes calculating the second intensity difference between the fourth light intensity and the third light intensity, determining whether the first intensity difference is greater than first preset intensity, and determining whether the second intensity difference is greater than second preset intensity, and determining that the posture with which the user holds the terminal during the call is not a normal posture if the first intensity difference is greater than the first preset intensity or the second intensity difference is greater than the second preset intensity, or determining that the posture with which the user holds the terminal during the call is a normal posture if the first intensity difference is not greater than the first preset intensity and the second intensity difference is not greater than the second preset intensity.

In the fourth implementation manner, that the terminal determines, according to a first distance between the first optical proximity sensor and the reflecting object and a second distance between the second optical proximity sensor and the reflecting object, whether the posture with which the user holds the terminal during the call is a normal posture includes calculating the second intensity difference between the fourth light intensity and the third light intensity, calculating the first distance between the first optical proximity sensor and the reflecting object according to the first intensity difference, calculating the second distance between the second optical proximity sensor and the reflecting object according to the second intensity difference, determining whether the first distance is greater than a first preset distance, determining whether the second distance is greater than a second preset distance, and determining that the posture with which the user holds the terminal during the call is not a normal posture if the first distance is greater than the first preset distance or the second distance is greater than the second preset distance, or determining that the posture with which the user holds the terminal during the call is a normal posture if the first distance is not greater than the first preset distance and the second distance is not greater than the second preset distance.

The step of calculating the first distance between the first optical proximity sensor and the reflecting object according to the first intensity difference, and calculating the second distance between the second optical proximity sensor and the reflecting object according to the second intensity difference may be obtaining, from a correspondence between an intensity difference and a distance according to the first intensity difference and the second intensity difference, a distance corresponding to the first intensity difference and a distance corresponding to the second intensity difference, determining that the distance corresponding to the first intensity difference is the first distance between the first optical proximity sensor and the reflecting object, and determining that the distance corresponding to the second intensity difference is the second distance between the second optical proximity sensor and the reflecting object.

It should be noted that, when the second optical proximity sensor is disposed at the top of the terminal, if the posture with which the user holds the terminal during the call is a normal posture, the third infrared signal may not be reflected by the user's head. In this case, within preset duration after the third light intensity is obtained, whether the fourth infrared signal is received is detected. Within the preset duration after the third light intensity is obtained, if no fourth infrared signal is received and the first intensity difference is less than the first preset intensity, it is determined that the posture with which the user holds the terminal during the call is a normal posture. Alternatively, within the preset duration after the third light intensity is obtained, if no fourth infrared signal is received and the first distance is less than the first preset distance, it is determined that the posture with which the user holds the terminal during the call is a normal posture.

Further, when the second optical proximity sensor is disposed at the top of the terminal, within the preset duration after the third light intensity is obtained, if the fourth infrared signal is received, it is determined that the posture with which the user holds the terminal during the call is not a normal posture.

The second preset intensity, the second preset distance, and the preset duration may be set or modified as required. In this embodiment of the present disclosure, no specific limitation is imposed on the second preset intensity, the second preset distance, and the preset duration.

If the posture with which the user holds the terminal during the call is not a normal posture, step 205 is performed.

Step 205: If the posture with which the user holds the terminal during the call is not a normal posture, adjust a multi-microphone noise-canceling sound pickup range of the terminal.

If the posture with which the user holds the terminal during the call is not a normal posture, to ensure that a clear uplink voice can still be obtained for the user during the call even if the posture with which the user holds the terminal is a valgus posture or an outward posture, the multi-microphone noise-canceling sound pickup range of the terminal may be increased.

Further, to adjust the multi-microphone noise-canceling sound pickup range of the terminal more accurately, the multi-microphone noise-canceling sound pickup range of the terminal may be set to an obtained sound pickup range for the posture with which the user holds the terminal during the call. The terminal stores a posture and a sound pickup range. If the posture with which the user holds the terminal during the call is not a normal posture, a sound pickup range matching the abnormal posture is obtained from a correspondence between a posture and a sound pickup range according to the abnormal posture, and the multi-microphone noise-canceling sound pickup range of the terminal is set to the sound pickup range matching the abnormal posture.

Further, when the second optical proximity sensor is disposed on the front side of the terminal and below the terminal screen, if the posture with which the user holds the terminal during the call is not a normal posture, a valgus angle at which the user holds the terminal during the call may be obtained, and the multi-microphone noise-canceling sound pickup range of the terminal is adjusted according to the valgus angle. In this case, this step may be calculating an included angle between the terminal that is held by the user during the call and the reflecting object according to the first distance, the second distance, and a third distance between the first optical proximity sensor and the second optical proximity sensor, determining that the included angle is the valgus angle at which the user holds the terminal during the call, obtaining a sound pickup range matching the valgus angle, and adjusting the multi-microphone noise-canceling sound pickup range of the terminal to the sound pickup range matching the valgus angle.

The terminal stores a correspondence between a valgus angle range and a sound pickup range. Correspondingly, the step of obtaining a sound pickup range matching the valgus angle may be determining, by the terminal according to the valgus angle, a valgus angle range to which the valgus angle belongs, and obtaining, from the correspondence between a valgus angle range and a sound pickup range according to the valgus angle range to which the valgus angle belongs, the sound pickup range matching the valgus angle.

Further, if the posture with which the user holds the terminal during the call is a normal posture, the terminal obtains, from the correspondence between a posture and a sound pickup range according to the normal posture, a sound pickup range matching the normal posture, and adjusts the multi-microphone noise-canceling sound pickup range of the terminal to the sound pickup range matching the normal posture.

According to this embodiment of the present disclosure, a first infrared signal is transmitted, and a second infrared signal that is obtained after the first infrared signal is reflected by a reflecting object is received, whether a posture with which a user holds a terminal during a call is a normal posture is determined according to the first infrared signal and the second infrared signal, and if the posture with which the user holds the terminal during the call is not a normal posture, a multi-microphone noise-canceling sound pickup range of the terminal is adjusted. In the present disclosure, the multi-microphone noise-canceling sound pickup range of the terminal is adjusted according to the optical signals. Therefore, the multi-microphone noise-canceling sound pickup range of the terminal is not affected by ambient noise, and accuracy of adjusting the multi-microphone noise-canceling sound pickup range of the terminal can be improved.

Figure 3A:
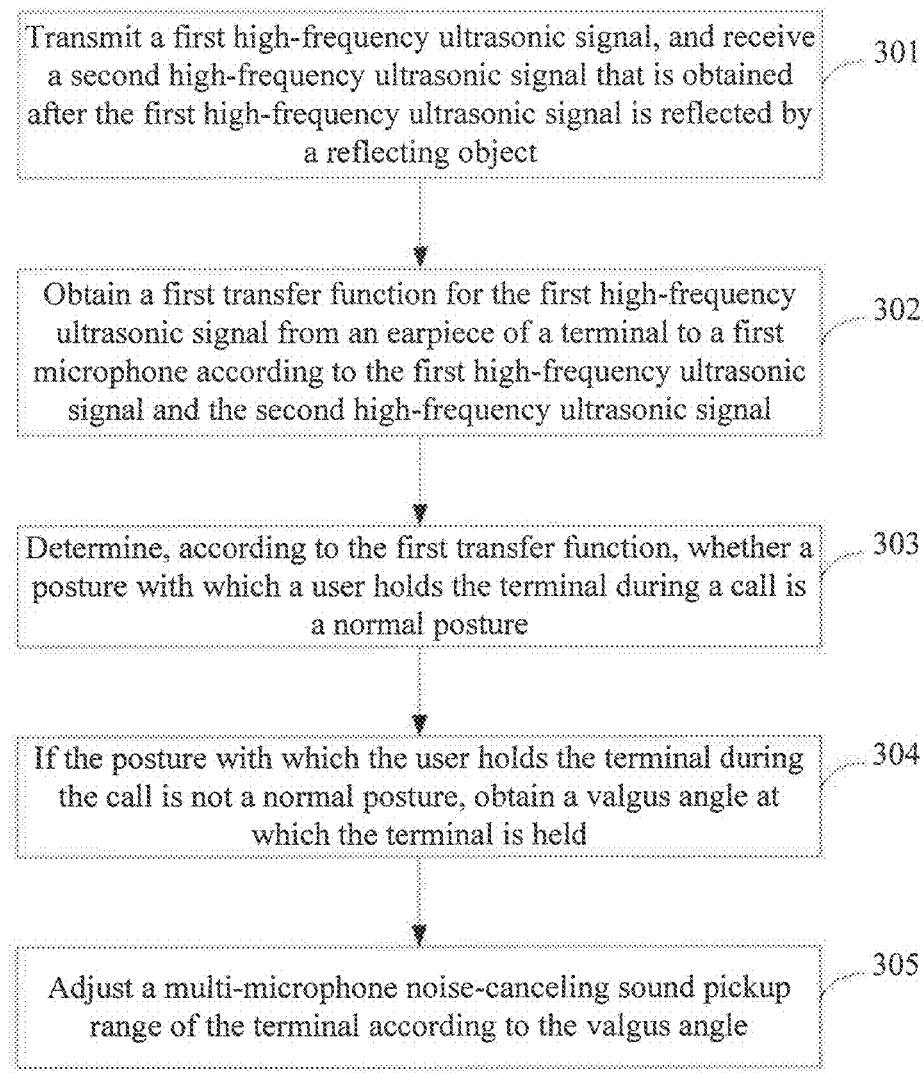
FIG. 3A is a flowchart of a method for controlling a multi-microphone noise-canceling sound pickup range of a terminal according to an embodiment of the present disclosure.

An embodiment of the present disclosure provides a method for controlling a multi-microphone noise-canceling sound pickup range of a terminal. The method is performed by a terminal. Referring to FIG. 3A, the method includes the following steps.

Step 301: Transmit a first high-frequency ultrasonic signal, and receive a second high-frequency ultrasonic signal that is obtained after the first high-frequency ultrasonic signal is reflected by a reflecting object.

The terminal has an earpiece, and the earpiece transmits the first high-frequency ultrasonic signal. A frequency of the first high-frequency ultrasonic signal is greater than a frequency of sound sensed by a user's ear such that the user's ear cannot sense the first high-frequency ultrasonic signal. Therefore, a user is not interfered with.

Figure 3B:
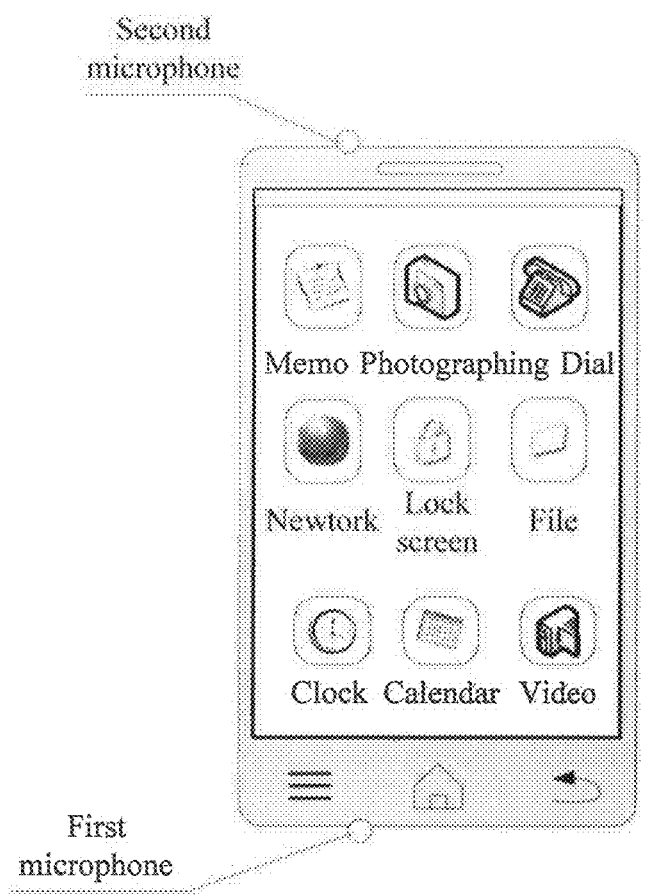
FIG. 3B is a schematic structural diagram of another terminal according to an embodiment of the present disclosure.

Referring to FIG. 3B, the terminal has at least two microphones. For ease of description, the microphones on the terminal are referred to as a first microphone and a second microphone. The first microphone may be disposed at a bottom of the terminal, and configured to collect a user voice including ambient noise. The second microphone may be disposed at a top of the terminal, and configured to collect ambient noise. The terminal processes two microphone input signals by means of multi-microphone noise-canceling, eliminates the ambient noise in the user voice including ambient noise to obtain a relatively clear user voice, and transfers the user voice to a peer end.

In this step, the first microphone of the terminal receives the second high-frequency ultrasonic signal that is obtained after the first high-frequency ultrasonic signal is reflected by the reflecting object, and the at least one second microphone receives the second high-frequency ultrasonic signal that is obtained after the first high-frequency ultrasonic signal is reflected by the reflecting object. Then, step 302 is performed.

Step 302: Obtain a first transfer function for the first high-frequency ultrasonic signal from an earpiece of the terminal to a first microphone according to the first high-frequency ultrasonic signal and the second high-frequency ultrasonic signal.

The first transfer function for the first high-frequency ultrasonic signal from the earpiece of the terminal to the first microphone is obtained according to the first high-frequency ultrasonic signal and the second high-frequency ultrasonic signal that is received by the first microphone. The first transfer function is used to indicate a path for transmitting the first high-frequency ultrasonic signal from the earpiece to the first microphone. In addition, calculation of the first transfer function for the first high-frequency ultrasonic signal from the earpiece of the terminal to the first microphone is the other approaches, and details are not described herein.

Further, for each of the at least one second microphone, a second transfer function for the first high-frequency ultrasonic signal from the earpiece of the terminal to the second microphone is obtained according to the first high-frequency signal and the second high-frequency ultrasonic signal that is received by the second microphone. The second transfer function is used to indicate a path for transmitting the first high-frequency ultrasonic signal from the earpiece to the second microphone. In addition, calculation of the second transfer function for the first high-frequency ultrasonic signal from the earpiece of the terminal to the second microphone is the other approaches, and details are not described herein.

It should be noted that a transfer function is an existing concept. The transfer function is not detailed herein.

Step 303: Determine, according to the first transfer function, whether a posture with which a user holds the terminal during a call is a normal posture.

A normal posture features that an upper side of a terminal that is held by a user approaches a user's ear during a call, and an included angle between a lower side of the terminal and a user's face is less than a preset angle.

This step may be implemented in the following first manner or second manner. In the first implementation manner, this step may be implemented by virtue of the following steps (1) and (2).

Step (1): Calculate a first similarity between the first transfer function and a transfer function corresponding to a normal posture.

The terminal stores the transfer function corresponding to the normal posture. The first similarity between the first transfer function and the transfer function corresponding to the normal posture is calculated according to the first transfer function and the transfer function corresponding to the normal posture.

Step (2): If the first similarity is less than a first preset similarity, determine that the posture with which the user holds the terminal during the call is not a normal posture.

Whether the first similarity is less than the first preset similarity is determined. If the first similarity is less than the first preset similarity, it is determined that the posture with which the user holds the terminal during the call is not a normal posture, or if the first similarity is not less than the first preset similarity, it is determined that the posture with which the user holds the terminal during the call is a normal posture.

If a posture with which a user holds a terminal during a call is not a normal posture, the posture with which the user holds the terminal during the call may be a valgus posture, an outward posture, or the like. A valgus posture features that an upper side of a terminal approaches a user's ear, and an included angle between a lower side of the terminal and a user's face is greater than a preset angle. An outward posture features that an upper side of a terminal does not approach a user's ear, and an included angle between a lower side of the terminal and a user's face is greater than a preset angle.

The first preset similarity may be set or modified as required. In this embodiment of the present disclosure, no specific limitation is imposed on the first preset similarity. For example, the first preset similarity may be 0.6 or 0.8.

In the second implementation manner, this step may be implemented by virtue of the following steps (A) to (D).

Step (A): Obtain a second transfer function for the first high-frequency ultrasonic signal from the earpiece of the terminal to the at least one second microphone according to the first high-frequency ultrasonic signal and the second high-frequency ultrasonic signal to obtain at least one second transfer function.

Step (B): Calculate a first similarity between the first transfer function and a transfer function corresponding to a normal posture, and a second similarity between each of the at least one second transfer function and the transfer function corresponding to the normal posture to obtain at least one second similarity.

Step (C): Calculate a comprehensive similarity according to the first similarity and the at least one second similarity.

A first weight corresponding to the first similarity and a second weight corresponding to each of the at least one second similarity are obtained, and the comprehensive similarity is calculated according to the first similarity, the first weight, each second similarity, and the second weight corresponding to each second similarity, or a largest similarity is selected among the first similarity and the at least one second similarity, and the largest similarity is used as the comprehensive similarity, or a smallest similarity is selected among the first similarity and the at least one second similarity, and the smallest similarity is used as the comprehensive similarity.

Step (D): If the comprehensive similarity is less than a second preset similarity, determine that the posture with which the user holds the terminal during the call is not a normal posture.

The second preset similarity may be set or modified as required. In this embodiment of the present disclosure, no specific limitation is imposed on the second preset similarity.

Further, if the comprehensive similarity is not less than the second preset similarity, it is determined that the posture with which the user holds the terminal during the call is a normal posture.

Step 304: If the posture with which the user holds the terminal during the call is not a normal posture, obtain a valgus angle at which the terminal is held.

This step may be implemented by virtue of the following steps (1) to (3).

Step (1): Separately calculate a third similarity between the first transfer function and each transfer function in a transfer function set according to the first transfer function.

The transfer function set is used to store a transfer function corresponding to each valgus angle at which the user holds the terminal during the call.

Step (2): Select a transfer function that has a largest third similarity with the first transfer function.

Step (3): Determine that a valgus angle corresponding to the selected transfer function is the valgus angle at which the user holds the terminal during the call.

Step 305: Adjust a multi-microphone noise-canceling sound pickup range of the terminal according to the valgus angle.

If the posture with which the user holds the terminal during the call is not a normal posture, to ensure that a clear uplink voice can still be obtained for the user during the call even if the posture with which the user holds the terminal is a valgus posture or an outward posture, the multi-microphone noise-canceling sound pickup range of the terminal may be increased.

Further, to adjust the multi-microphone noise-canceling sound pickup range of the terminal more accurately, the multi-microphone noise-canceling sound pickup range of the terminal may be set to a sound pickup range matching the valgus angle. The terminal stores a correspondence between a valgus angle and a sound pickup range. In this case, this step may be obtaining, from the correspondence between a valgus angle range and a sound pickup range according to the valgus angle range, a sound pickup range matching the valgus angle, and adjusting the multi-microphone noise-canceling sound pickup range of the terminal to the sound pickup range matching the valgus angle.

Further, if the posture with which the user holds the terminal during the call is a normal posture, a sound pickup range matching the normal posture is obtained, and the multi-microphone noise-canceling sound pickup range of the terminal is adjusted to the sound pickup range matching the normal posture.

According to this embodiment of the present disclosure, a first high-frequency ultrasonic signal is transmitted, and a second high-frequency ultrasonic signal that is obtained after the first high-frequency ultrasonic signal is reflected by a reflecting object is received, whether a posture with which a user holds a terminal during a call is a normal posture is determined according to the first high-frequency ultrasonic signal and the second high-frequency ultrasonic signal, and if the posture with which the user holds the terminal during the call is not a normal posture, a multi-microphone noise-canceling sound pickup range of the terminal is adjusted. In the present disclosure, the multi-microphone noise-canceling sound pickup range of the terminal is adjusted according to the high-frequency ultrasonic signals. Therefore, the multi-microphone noise-canceling sound pickup range of the terminal is not affected by ambient noise, and accuracy of adjusting the multi-microphone noise-canceling sound pickup range of the terminal can be improved.

Figure 4A:
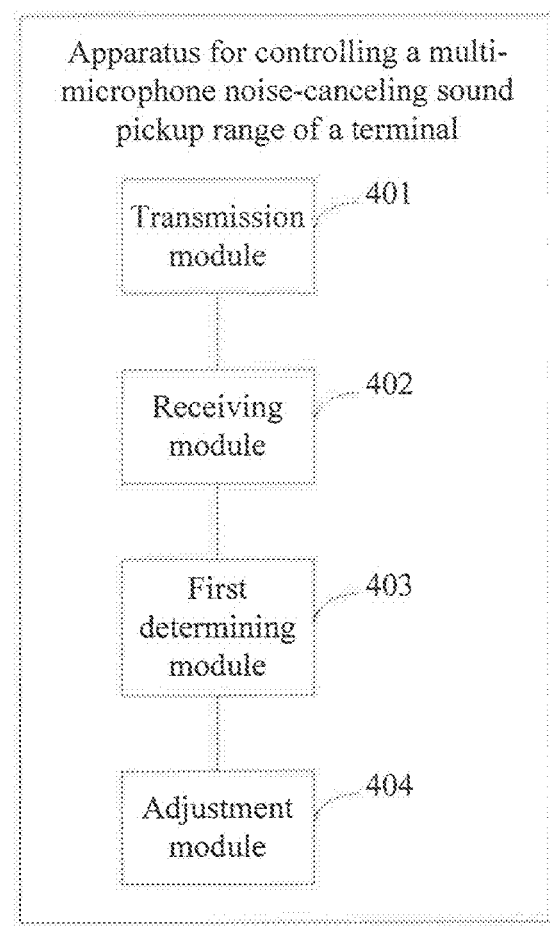
FIG. 4A is a schematic structural diagram of an apparatus for controlling a multi-microphone noise-canceling sound pickup range of a terminal according to an embodiment of the present disclosure.

An embodiment of the present disclosure provides an apparatus for controlling a multi-microphone noise-canceling sound pickup range of a terminal. Referring to FIG. 4A, the apparatus includes a transmission module 401 configured to transmit a first non-voice signal, a receiving module 402 configured to receive a second non-voice signal that is obtained after the first non-voice signal is reflected by a reflecting object, a first determining module 403 configured to determine, according to the first non-voice signal and the second non-voice signal, whether a posture with which a user holds a terminal during a call is a normal posture, and an adjustment module 404 configured to if the posture with which the user holds the terminal during the call is not a normal posture, adjust a multi-microphone noise-canceling sound pickup range of the terminal.

Figure 4B:
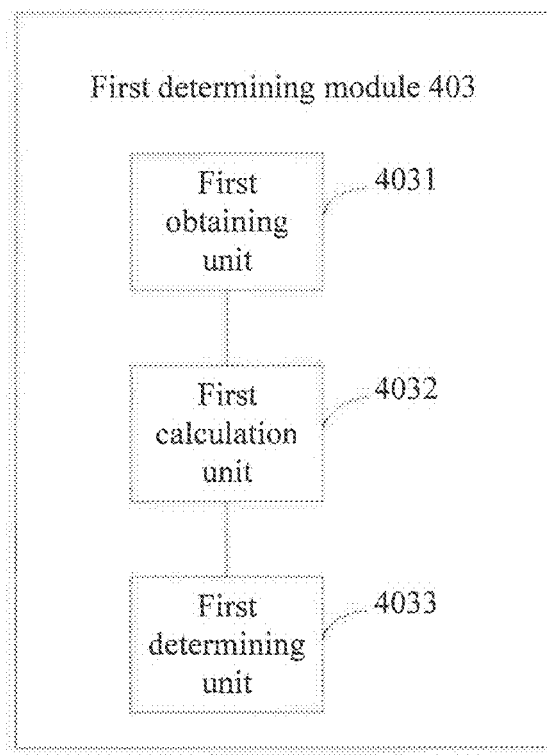
FIG. 4B is a schematic structural diagram of a first determining module according to an embodiment of the present disclosure.

Further, the first non-voice signal is a first infrared signal, and the second non-voice signal is a second infrared signal, and referring to FIG. 4B, the first determining module 403 includes a first obtaining unit 4031 configured to obtain first light intensity of the first infrared signal transmitted by a first optical proximity sensor on the terminal and second light intensity of the second infrared signal received by the first optical proximity sensor, a first calculation unit 4032 configured to calculate a first intensity difference between the second light intensity and the first light intensity, and a first determining unit 4033 configured to determine, according to the first intensity difference, whether the posture with which the user holds the terminal during the call is a normal posture.

The first determining unit 4033 is further configured to determine that the posture with which the user holds the terminal during the call is not a normal posture if the first intensity difference is greater than first preset intensity, or calculate a first distance between the first optical proximity sensor and the reflecting object according to the first intensity difference, and determine that the posture with which the user holds the terminal during the call is not a normal posture if the first distance is greater than a first preset distance.

Figure 4C:
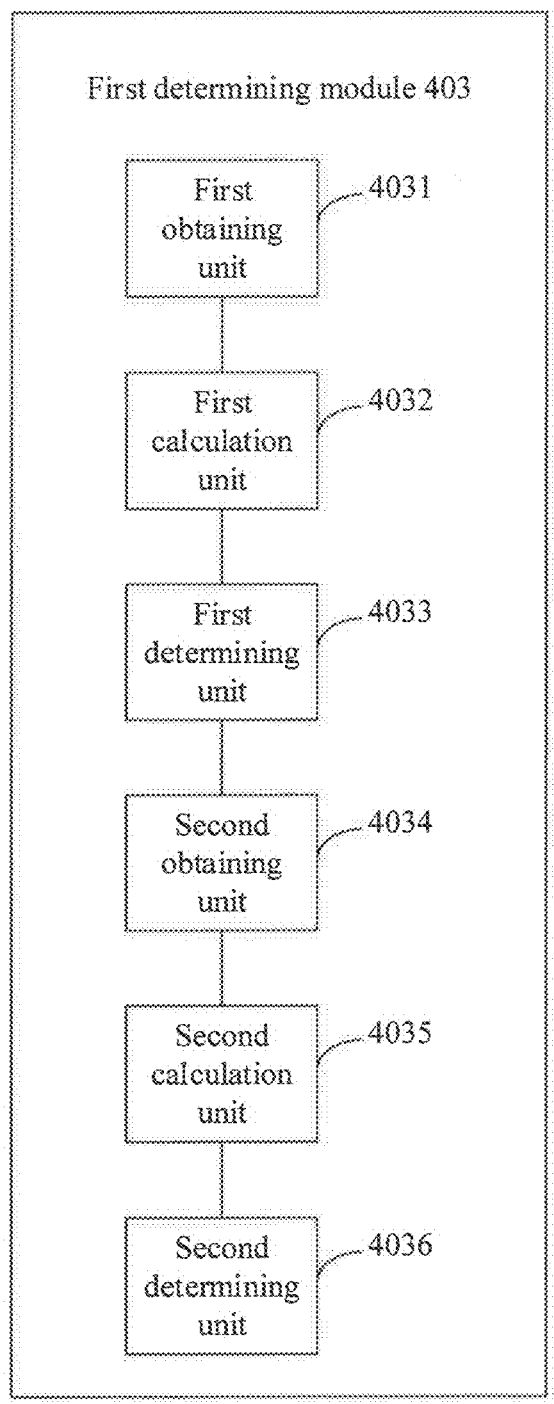
FIG. 4C is a schematic structural diagram of another first determining module according to an embodiment of the present disclosure.

Referring to FIG. 4C, the first determining module 403 further includes a second obtaining unit 4034 configured to obtain third light intensity of a third infrared signal transmitted by a second optical proximity sensor on the terminal and fourth light intensity of a fourth infrared signal that is obtained after the third infrared signal is reflected by the reflecting object and that is received by the second optical proximity sensor, a second calculation unit 4035 configured to calculate a second intensity difference between the fourth light intensity and the third light intensity, and a second determining unit 4036 configured to determine that the posture with which the user holds the terminal during the call is not a normal posture if the second intensity difference is greater than second preset intensity, where if the second intensity difference is not greater than the second preset intensity, the first determining unit 4033 is executed to determine, according to the first intensity difference, whether the posture with which the user holds the terminal during the call is a normal posture.

Figure 4D:
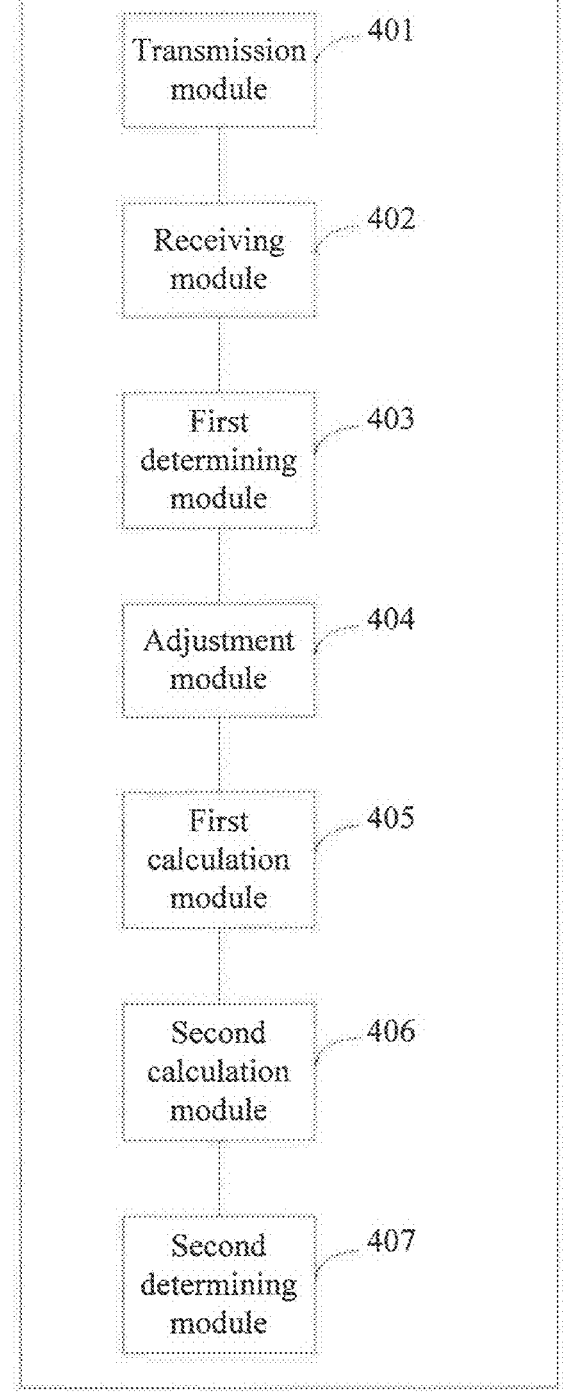
FIG. 4D is a schematic structural diagram of another apparatus for controlling a multi-microphone noise-canceling sound pickup range of a terminal according to an embodiment of the present disclosure.

Referring to FIG. 4D, the apparatus further includes a first calculation module 405 configured to calculate a first distance between the first optical proximity sensor and the reflecting object and a second distance between the second optical proximity sensor and the reflecting object respectively according to the first intensity difference and the second intensity difference, a second calculation module 406 configured to calculate an included angle between the terminal and the reflecting object according to the first distance, the second distance, and a third distance between the first optical proximity sensor and the second optical proximity sensor, and a second determining module 407 configured to determine that the included angle is a valgus angle at which the user holds the terminal during the call.

Figure 4E:
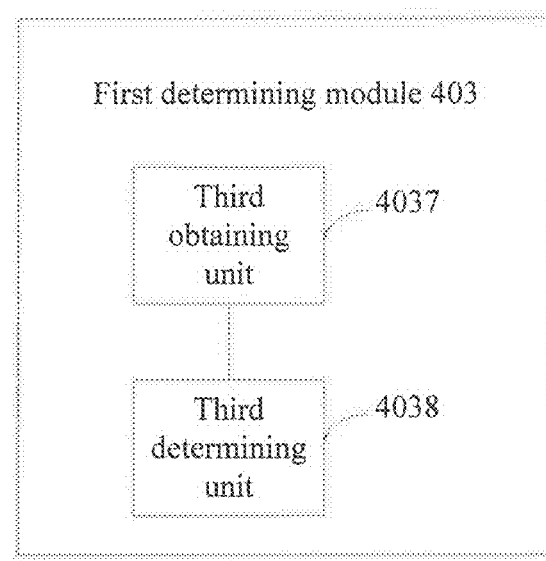
FIG. 4E is a schematic structural diagram of another first determining module according to an embodiment of the present disclosure.

Further, the first non-voice signal is a first high-frequency ultrasonic signal, and the second non-voice signal is a second high-frequency ultrasonic signal, and referring to FIG. 4E, the first determining module 403 includes a third obtaining unit 4037 configured to obtain a first transfer function for the first high-frequency ultrasonic signal from an earpiece of the terminal to a first microphone according to the first high-frequency ultrasonic signal and the second high-frequency ultrasonic signal, and a third determining unit 4038 configured to determine, according to the first transfer function, whether the posture with which the user holds the terminal during the call is a normal posture.

Figure 4F:
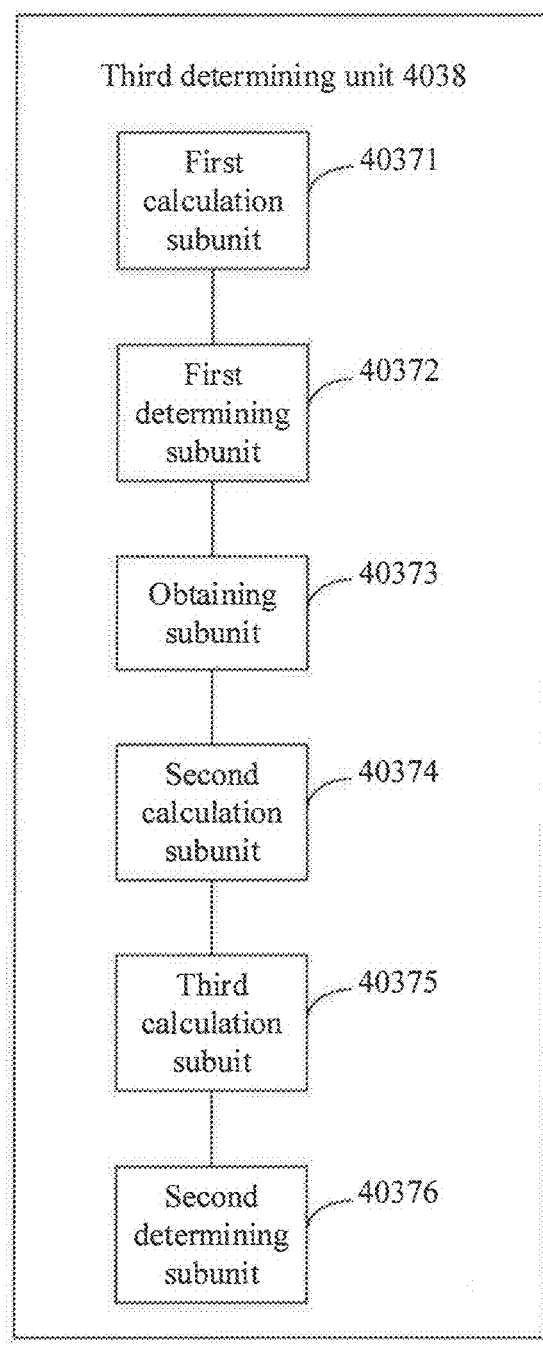
FIG. 4F is a schematic structural diagram of another third determining unit according to an embodiment of the present disclosure.

Further, referring to FIG. 4F, the third determining unit 4038 includes a first calculation subunit 40371 configured to calculate a first similarity between the first transfer function and a transfer function corresponding to a normal posture, and a first determining subunit 40372 configured to determine that the posture with which the user holds the terminal during the call is not a normal posture if the first similarity is less than a first preset similarity.

The third determining unit 4038 further includes an obtaining subunit 40373 configured to obtain at least one second transfer function for the first high-frequency ultrasonic signal from the earpiece of the terminal to at least one second microphone according to the first high-frequency ultrasonic signal and the second high-frequency ultrasonic signal, a second calculation subunit 40374 configured to calculate a first similarity between the first transfer function and a transfer function corresponding to a normal posture, and a second similarity between each of the at least one second transfer function and the transfer function corresponding to the normal posture to obtain at least one second similarity, a third calculation subunit 40375 configured to calculate a comprehensive similarity according to the first similarity and the at least one second similarity, and a second determining subunit 40376 configured to determine that the posture with which the user holds the terminal during the call is not a normal posture if the comprehensive similarity is less than a second preset similarity.

Figure 4G:
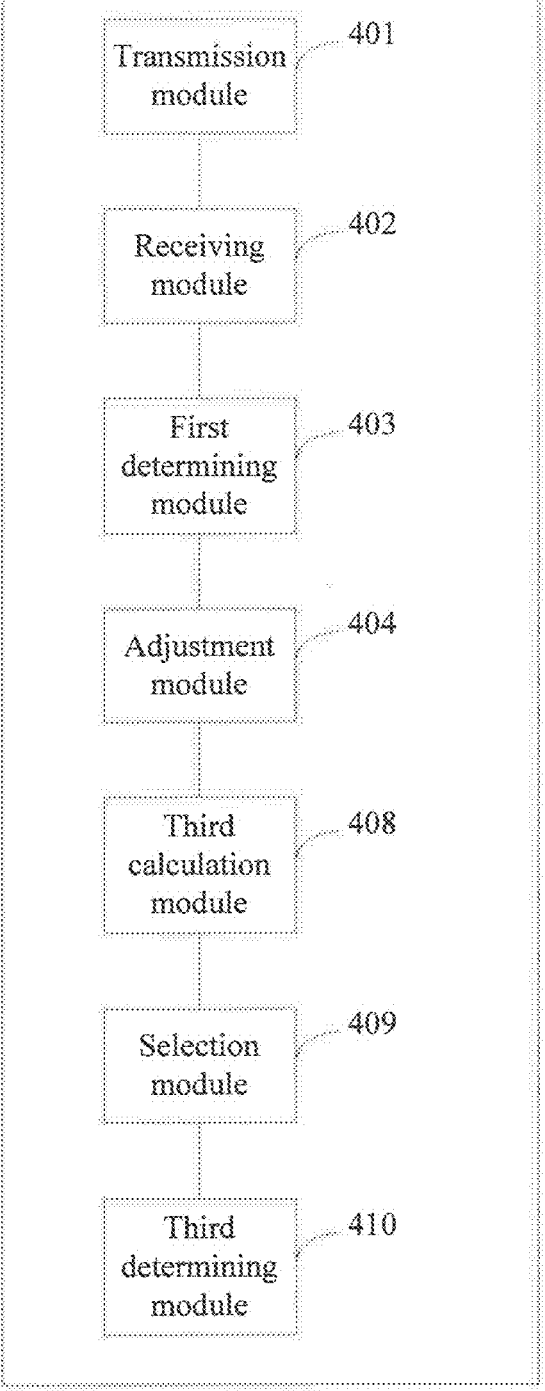
FIG. 4G is a schematic structural diagram of another apparatus for controlling a multi-microphone noise-canceling sound pickup range of a terminal according to an embodiment of the present disclosure.

Further, referring to FIG. 4G, the apparatus further includes a third calculation module 408 configured to separately calculate a third similarity between the first transfer function and each transfer function in a transfer function set according to the first transfer function, where the transfer function set is used to store a transfer function corresponding to each valgus angle at which the user holds the terminal during the call, a selection module 409 configured to select a transfer function that has a largest third similarity with the first transfer function, and a third determining module 410 configured to determine that a valgus angle corresponding to the selected transfer function is a valgus angle at which the user holds the terminal during the call.

Figure 4H:
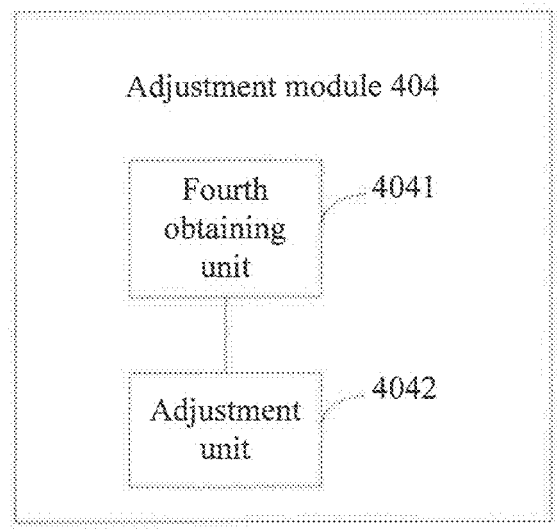
FIG. 4H is a schematic structural diagram of an adjustment module according to an embodiment of the present disclosure.

Further, referring to FIG. 4H, the adjustment module 404 is configured to increase the multi-microphone noise-canceling sound pickup range of the terminal, or the adjustment module 404 includes a fourth obtaining unit 4041 configured to obtain a sound pickup range matching the valgus angle, and an adjustment unit 4042 configured to adjust the multi-microphone noise-canceling sound pickup range of the terminal to the sound pickup range matching the valgus angle.

According to this embodiment of the present disclosure, a first non-voice signal is transmitted, and a second non-voice signal that is obtained after the first non-voice signal is reflected by a reflecting object is received, whether a posture with which a user holds a terminal during a call is a normal posture is determined according to the first non-voice signal and the second non-voice signal, and if the posture with which the user holds the terminal during the call is not a normal posture, a multi-microphone noise-canceling sound pickup range of the terminal is adjusted. In the present disclosure, the multi-microphone noise-canceling sound pickup range of the terminal is adjusted according to the non-voice signals. Therefore, the multi-microphone noise-canceling sound pickup range of the terminal is not affected by ambient noise, and accuracy of adjusting the multi-microphone noise-canceling sound pickup range of the terminal can be improved.

Figure 5A:
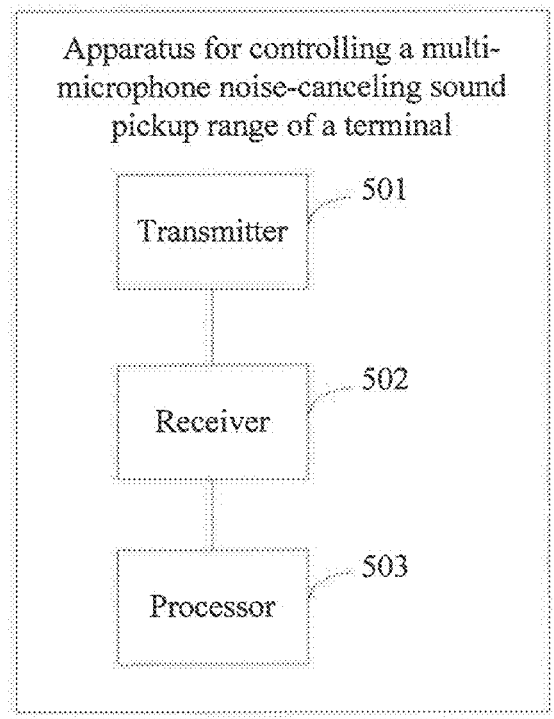
FIG. 5A is a schematic structural diagram of another apparatus for controlling a multi-microphone noise-canceling sound pickup range of a terminal according to an embodiment of the present disclosure.

An embodiment of the present disclosure provides an apparatus for controlling a multi-microphone noise-canceling sound pickup range of a terminal. Referring to FIG. 5A, the apparatus includes a transmitter 501, a receiver 502, and a processor 503, where the transmitter 501 is configured to transmit a first non-voice signal. The receiver 502 is configured to receive a second non-voice signal that is obtained after the first non-voice signal is reflected by a reflecting object. The processor 503 is configured to determine, according to the first non-voice signal and the second non-voice signal, whether a posture with which a user holds a terminal during a call is a normal posture, and adjust a multi-microphone noise-canceling sound pickup range of the terminal if the posture with which the user holds the terminal during the call is not a normal posture.

Further, the first non-voice signal is a first infrared signal, and the second non-voice signal is a second infrared signal, and the processor 503 is further configured to obtain first light intensity of the first infrared signal transmitted by a first optical proximity sensor on the terminal and second light intensity of the second infrared signal received by the first optical proximity sensor, calculate a first intensity difference between the second light intensity and the first light intensity, and determine, according to the first intensity difference, whether the posture with which the user holds the terminal during the call is a normal posture.

The processor 503 is further configured to determine that the posture with which the user holds the terminal during the call is not a normal posture if the first intensity difference is greater than first preset intensity, or calculate a first distance between the first optical proximity sensor and the reflecting object according to the first intensity difference, and determine that the posture with which the user holds the terminal during the call is not a normal posture if the first distance is greater than a first preset distance.

The processor 503 is further configured to obtain third light intensity of a third infrared signal transmitted by a second optical proximity sensor on the terminal and fourth light intensity of a fourth infrared signal that is obtained after the third infrared signal is reflected by the reflecting object and that is received by the second optical proximity sensor, calculate a second intensity difference between the fourth light intensity and the third light intensity, determine that the posture with which the user holds the terminal during the call is not a normal posture if the second intensity difference is greater than second preset intensity, or determine, according to the first intensity difference, whether the posture with which the user holds the terminal during the call is a normal posture if the second intensity difference is not greater than second preset intensity.

The processor 503 is further configured to calculate a first distance between the first optical proximity sensor and the reflecting object and a second distance between the second optical proximity sensor and the reflecting object respectively according to the first intensity difference and the second intensity difference, the processor 503 is further configured to calculate an included angle between the terminal and the reflecting object according to the first distance, the second distance, and a third distance between the first optical proximity sensor and the second optical proximity sensor, and the processor 503 is further configured to determine that the included angle is a valgus angle at which the user holds the terminal during the call.

Figure 5B:
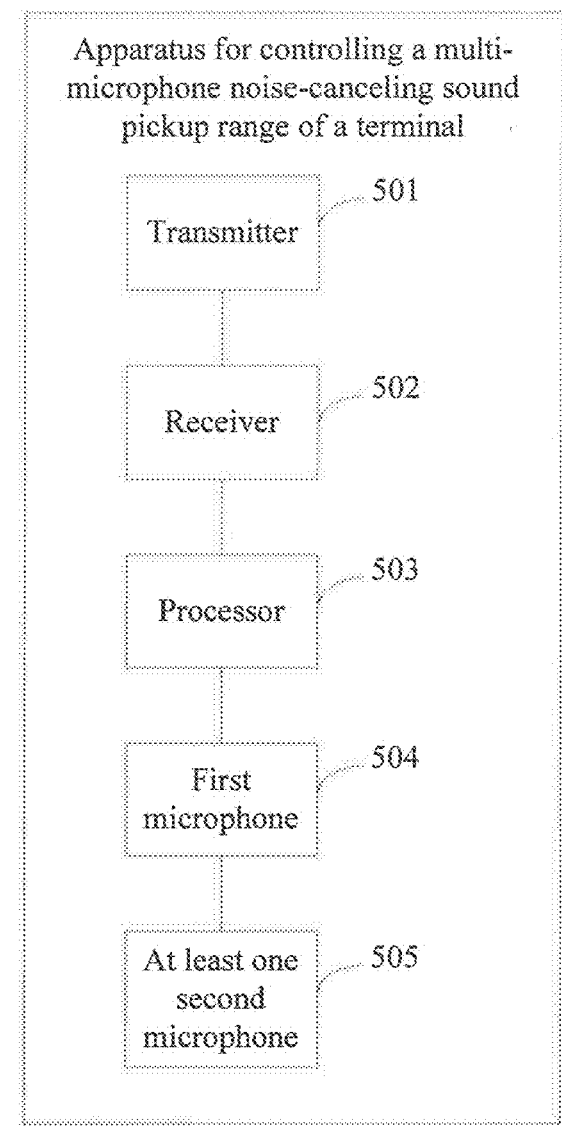
FIG. 5B is a schematic structural diagram of another apparatus for controlling a multi-microphone noise-canceling sound pickup range of a terminal according to an embodiment of the present disclosure.

Further, the first non-voice signal is a first high-frequency ultrasonic signal, and the second non-voice signal is a second high-frequency ultrasonic signal, referring to FIG. 5B, the apparatus further includes a first microphone 504, and the processor 503 is further configured to obtain a first transfer function for the first high-frequency ultrasonic signal from an earpiece of the terminal to the first microphone according to the first high-frequency ultrasonic signal and the second high-frequency ultrasonic signal, and the processor 503 is further configured to determine, according to the first transfer function, whether the posture with which the user holds the terminal during the call is a normal posture.

The processor 503 is further configured to calculate a first similarity between the first transfer function and a transfer function corresponding to a normal posture, and determine that the posture with which the user holds the terminal during the call is not a normal posture if the first similarity is less than a first preset similarity.

The apparatus further includes at least one second microphone 505, and the processor 503 is further configured to obtain at least one second transfer function for the first high-frequency ultrasonic signal from the earpiece of the terminal to the at least one second microphone according to the first high-frequency ultrasonic signal and the second high-frequency ultrasonic signal, calculate a first similarity between the first transfer function and a transfer function corresponding to a normal posture, and a second similarity between each of the at least one second transfer function and the transfer function corresponding to the normal posture to obtain at least one second similarity, calculate a comprehensive similarity according to the first similarity and the at least one second similarity, and determine that the posture with which the user holds the terminal during the call is not a normal posture if the comprehensive similarity is less than a second preset similarity.

The processor 503 is further configured to separately calculate a third similarity between the first transfer function and each transfer function in a transfer function set according to the first transfer function, where the transfer function set is used to store a transfer function corresponding to each valgus angle at which the user holds the terminal during the call, select a transfer function that has a largest third similarity with the first transfer function, and determine that a valgus angle corresponding to the selected transfer function is a valgus angle at which the user holds the terminal during the call.

The processor 503 is further configured to increase the multi-microphone noise-canceling sound pickup range of the terminal, or obtain a sound pickup range matching the valgus angle, and adjust the multi-microphone noise-canceling sound pickup range of the terminal to the sound pickup range matching the valgus angle.

According to this embodiment of the present disclosure, a first non-voice signal is transmitted, and a second non-voice signal that is obtained after the first non-voice signal is reflected by a reflecting object is received, whether a posture with which a user holds a terminal during a call is a normal posture is determined according to the first non-voice signal and the second non-voice signal, and if the posture with which the user holds the terminal during the call is not a normal posture, a multi-microphone noise-canceling sound pickup range of the terminal is adjusted. In the present disclosure, the multi-microphone noise-canceling sound pickup range of the terminal is adjusted according to the non-voice signals. Therefore, the multi-microphone noise-canceling sound pickup range of the terminal is not affected by ambient noise, and accuracy of adjusting the multi-microphone noise-canceling sound pickup range of the terminal can be improved.

The present disclosure provides a computer-readable storage medium for storing one or more programs, where the one or more programs include an instruction, and when the instruction is executed by a portable electronic device that includes multiple application programs, the portable electronic device is enabled to transmit a first non-voice signal, and receive a second non-voice signal that is obtained after the first non-voice signal is reflected by a reflecting object, determine, according to the first non-voice signal and the second non-voice signal, whether a posture with which a user holds a terminal during a call is a normal posture, and adjust a multi-microphone noise-canceling sound pickup range of the terminal if the posture with which the user holds the terminal during the call is not a normal posture.

With reference to the fourth aspect, in a first possible implementation manner of the fourth aspect, the first non-voice signal is a first infrared signal, and the second non-voice signal is a second infrared signal, and when the instruction is executed by the portable electronic device that includes multiple application programs, the portable electronic device is enabled to obtain first light intensity of the first infrared signal transmitted by a first optical proximity sensor on the terminal and second light intensity of the second infrared signal received by the first optical proximity sensor, calculate a first intensity difference between the second light intensity and the first light intensity, and determine, according to the first intensity difference, whether the posture with which the user holds the terminal during the call is a normal posture.

Further, when the instruction is executed by the portable electronic device that includes multiple application programs, if the first intensity difference is greater than first preset intensity, the portable electronic device is enabled to determine that the posture with which the user holds the terminal during the call is not a normal posture, or calculate a first distance between the first optical proximity sensor and the reflecting object according to the first intensity difference, and determine that the posture with which the user holds the terminal during the call is not a normal posture if the first distance is greater than a first preset distance.

Further, when the instruction is executed by the portable electronic device that includes multiple application programs, the portable electronic device is enabled to obtain third light intensity of a third infrared signal transmitted by a second optical proximity sensor on the terminal and fourth light intensity of a fourth infrared signal that is obtained after the third infrared signal is reflected by the reflecting object and that is received by the second optical proximity sensor, calculate a second intensity difference between the fourth light intensity and the third light intensity, and determine that the posture with which the user holds the terminal during the call is not a normal posture if the second intensity difference is greater than second preset intensity, or perform the step of determining, according to the first intensity difference, whether the posture with which the user holds the terminal during the call is a normal posture if the second intensity difference is not greater than the second preset intensity.

Further, when the instruction is executed by the portable electronic device that includes multiple application programs, the portable electronic device is enabled to calculate a first distance between the first optical proximity sensor and the reflecting object and a second distance between the second optical proximity sensor and the reflecting object respectively according to the first intensity difference and the second intensity difference, calculate an included angle between the terminal and the reflecting object according to the first distance, the second distance, and a third distance between the first optical proximity sensor and the second optical proximity sensor, and determine that the included angle is a valgus angle at which the user holds the terminal.

Further, the first non-voice signal is a first high-frequency ultrasonic signal, and the second non-voice signal is a second high-frequency ultrasonic signal, and when the instruction is executed by the portable electronic device that includes multiple application programs, the portable electronic device is enabled to obtain a first transfer function for the first high-frequency ultrasonic signal from an earpiece of the terminal to a first microphone according to the first high-frequency ultrasonic signal and the second high-frequency ultrasonic signal, and determine, according to the first transfer function, whether the posture with which the user holds the terminal during the call is a normal posture.

Further, when the instruction is executed by the portable electronic device that includes multiple application programs, the portable electronic device is enabled to calculate a first similarity between the first transfer function and a transfer function corresponding to a normal posture, and determine that the posture with which the user holds the terminal during the call is not a normal posture if the first similarity is less than a first preset similarity.

Further, when the instruction is executed by the portable electronic device that includes multiple application programs, the portable electronic device is enabled to obtain at least one second transfer function for the first high-frequency ultrasonic signal from the earpiece of the terminal to at least one second microphone according to the first high-frequency ultrasonic signal and the second high-frequency ultrasonic signal, calculate a first similarity between the first transfer function and a transfer function corresponding to a normal posture, and a second similarity between each of the at least one second transfer function and the transfer function corresponding to the normal posture to obtain at least one second similarity, calculate a comprehensive similarity according to the first similarity and the at least one second similarity, and determine that the posture with which the user holds the terminal during the call is not a normal posture if the comprehensive similarity is less than a second preset similarity.

Further, when the instruction is executed by the portable electronic device that includes multiple application programs, the portable electronic device is enabled to separately calculate a third similarity between the first transfer function and each transfer function in a transfer function set according to the first transfer function, where the transfer function set is used to store a transfer function corresponding to each valgus angle at which the user holds the terminal during the call, select a transfer function that has a largest third similarity with the first transfer function, and determine that a valgus angle corresponding to the selected transfer function is a valgus angle at which the user holds the terminal during the call.

Further, when the instruction is executed by the portable electronic device that includes multiple application programs, the portable electronic device is enabled to increase the multi-microphone noise-canceling sound pickup range of the terminal, or obtain a sound pickup range matching the valgus angle, and adjust the multi-microphone noise-canceling sound pickup range of the terminal to the sound pickup range matching the valgus angle.

According to this embodiment of the present disclosure, a first non-voice signal is transmitted, and a second non-voice signal that is obtained after the first non-voice signal is reflected by a reflecting object is received, whether a posture with which a user holds a terminal during a call is a normal posture is determined according to the first non-voice signal and the second non-voice signal, and if the posture with which the user holds the terminal during the call is not a normal posture, a multi-microphone noise-canceling sound pickup range of the terminal is adjusted. In the present disclosure, the multi-microphone noise-canceling sound pickup range of the terminal is adjusted according to the non-voice signals. Therefore, the multi-microphone noise-canceling sound pickup range of the terminal is not affected by ambient noise, and accuracy of adjusting the multi-microphone noise-canceling sound pickup range of the terminal can be improved.

It should be noted that, the division of the foregoing functional modules is merely used as an example for description when the apparatus for controlling a multi-microphone noise-canceling sound pickup range of a terminal that is provided in the foregoing embodiments controls a multi-microphone noise-canceling sound pickup range of a terminal. In actual application, the foregoing functions may be allocated to different functional modules for implementation according to a requirement, That is, an internal structure of the apparatus may be divided into different functional modules so as to implement all or some of the functions described above. In addition, the apparatus for controlling a multi-microphone noise-canceling sound pickup range of a terminal and the method for controlling a multi-microphone noise-canceling sound pickup range of a terminal that are provided in the foregoing embodiments belong to a same concept. For a specific implementation process, reference is made to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely examples of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for controlling a multi-microphone noise-canceling sound pickup range of a terminal, comprising:
   transmitting a first non-voice signal;
   receiving a second non-voice signal that is obtained after the first non-voice signal is received from a reflecting object;
   determining, according to the first non-voice signal and the second non-voice signal, whether a posture with which a user holds the terminal during a call is a normal posture; and
   adjusting the multi-microphone noise-canceling sound pickup range of the terminal when the posture with which the user holds the terminal during the call is not the normal posture, the first non-voice signal comprising a first infrared signal, the second non-voice signal comprising a second infrared signal, and determining whether the posture with which the user holds the terminal during the call is the normal posture comprising:
      obtaining first light intensity of the first infrared signal transmitted by a first optical proximity sensor on the terminal and second light intensity of the second infrared signal received by the first optical proximity sensor;
      calculating a first intensity difference between the second light intensity and the first light intensity;
      determining, according to the first intensity difference, whether the posture with which the user holds the terminal during the call is the normal posture;
      obtaining third light intensity of a third infrared signal transmitted by a second optical proximity sensor on the terminal and fourth light intensity of a fourth infrared signal that is obtained after the third infrared signal is received from the reflecting object and that is received by the second optical proximity sensor;
      calculating a second intensity difference between the fourth light intensity and the third light intensity;
      calculating a first distance between the first optical proximity sensor and the reflecting object and a second distance between the second optical proximity sensor and the reflecting object respectively according to the first intensity difference and the second intensity difference;
      calculating an included angle between the terminal and the reflecting object according to the first distance, the second distance, and a third distance between the first optical proximity sensor and the second optical proximity sensor; and
      determining that the included angle comprises a valgus angle at which the user holds the terminal.

2. The method of claim 1, wherein determining whether the posture with which the user holds the terminal during the call is the normal posture further comprises:
   determining that the posture with which the user holds the terminal during the call is not the normal posture when the first intensity difference is greater than first preset intensity;
   calculating a first distance between the first optical proximity sensor and the reflecting object according to the first intensity difference; and
   determining that the posture with which the user holds the terminal during the call is not the normal posture when the first distance is greater than a first preset distance.

3. The method of claim 1, wherein before determining whether the posture with which the user holds the terminal is the normal posture, the method further comprises:
   determining that the posture with which the user holds the terminal during the call is not the normal posture when the second intensity difference is greater than second preset intensity; and
   determining that the posture with which the user holds the terminal during the call is the normal posture when the second intensity difference is not greater than the second preset intensity.

4. The method of claim 1, wherein the first non-voice signal further comprises a first high-frequency ultrasonic signal, the second non-voice signal further comprises a second high-frequency ultrasonic signal, and determining whether the posture with which the user holds the terminal during the call is the normal posture comprising:
   obtaining a first transfer function for the first high-frequency ultrasonic signal from an earpiece of the terminal to a first microphone according to the first high-frequency ultrasonic signal and the second high-frequency ultrasonic signal; and
   determining, according to the first transfer function, whether the posture with which the user holds the terminal during the call is the normal posture.

5. The method of claim 4, wherein determining whether the posture with which the user holds the terminal during the call is the normal posture further comprises:
   calculating a first similarity between the first transfer function and a transfer function corresponding to the normal posture; and
   determining that the posture with which the user holds the terminal during the call is not the normal posture when the first similarity is less than a first preset similarity.

6. The method of claim 4, wherein determining whether the posture with which the user holds the terminal during the call is the normal posture further comprises:
   obtaining at least one second transfer function for the first high-frequency ultrasonic signal from the earpiece of the terminal to at least one second microphone according to the first high-frequency ultrasonic signal and the second high-frequency ultrasonic signal;
   calculating a first similarity between the first transfer function and a transfer function corresponding to the normal posture, and a second similarity between each of the at least one second transfer function and the transfer function corresponding to the normal posture to obtain at least one second similarity;

calculating a comprehensive similarity according to the first similarity and the at least one second similarity; and determining that the posture with which the user holds the terminal during the call is not the normal posture when the comprehensive similarity is less than a second preset similarity.

7. The method of claim 4, further comprising:

separately calculating a third similarity between the first transfer function and each transfer function in a transfer function set according to the first transfer function, wherein the transfer function set stores a transfer function corresponding to each valgus angle at which the user holds the terminal during the call;

selecting a transfer function that has a largest third similarity with the first transfer function; and determining that a valgus angle corresponding to the selected transfer function comprises a valgus angle at which the user holds the terminal during the call.

8. The method of claim 1, wherein adjusting the multi-microphone noise-canceling sound pickup range of the terminal comprises:

increasing the multi-microphone noise-canceling sound pickup range of the terminal; or obtaining a sound pickup range matching the valgus angle, and adjusting the multi-microphone noise-canceling sound pickup range of the terminal to the sound pickup range matching the valgus angle.

9. An apparatus for controlling a multi-microphone noise-canceling sound pickup range of a terminal, comprising:

a transmitter configured to transmit a first non-voice signal;

a receiver configured to receive a second non-voice signal that is obtained after the first non-voice signal is received from a reflecting object; and a processor coupled to the transmitter and the receiver and configured to:

determine, according to the first non-voice signal and the second non-voice signal, whether a posture with which a user holds the terminal during a call is a normal posture;

adjust the multi-microphone noise-canceling sound pickup range of the terminal when the posture with which the user holds the terminal during the call is not the normal posture, the first non-voice signal comprising a first infrared signal, and the second non-voice signal comprises a second infrared signal;

obtain first light intensity of the first infrared signal transmitted by a first optical proximity sensor on the terminal and second light intensity of the second infrared signal received by the first optical proximity sensor;

calculate a first intensity difference between the second light intensity and the first light intensity;

determine, according to the first intensity difference, whether the posture with which the user holds the terminal during the call is the normal posture;

obtain third light intensity of a third infrared signal transmitted by a second optical proximity sensor on the terminal and fourth light intensity of a fourth infrared signal that is obtained after the third infrared signal is received from the reflecting object and that is received by the second optical proximity sensor;

calculate a second intensity difference between the fourth light intensity and the third light intensity;

calculate a first distance between the first optical proximity sensor and the reflecting object and a second distance between the second optical proximity sensor and the reflecting object respectively according to the first intensity difference and the second intensity difference;

calculate an included angle between the terminal and the reflecting object according to the first distance, the second distance, and a third distance between the first optical proximity sensor and the second optical proximity sensor; and determine that the included angle is a valgus angle at which the user holds the terminal.

10. The apparatus of claim 9, wherein the processor is further configured to:

determine that the posture with which the user holds the terminal during the call is not the normal posture when the first intensity difference is greater than first preset intensity;

calculate a first distance between the first optical proximity sensor and the reflecting object according to the first intensity difference; and determine that the posture with which the user holds the terminal during the call is not the normal posture when the first distance is greater than a first preset distance.

11. The apparatus of claim 9, wherein the processor is further configured to:

determine that the posture with which the user holds the terminal during the call is not the normal posture when the second intensity difference is greater than second preset intensity; and determine that the posture with which the user holds the terminal during the call is the normal posture when the second intensity difference is not greater than the second preset intensity.

12. The apparatus of claim 9, wherein the apparatus further comprises a first microphone, the first non-voice signal further comprising first high-frequency ultrasonic signal, the second non-voice signal further comprising a second high-frequency ultrasonic signal, and the processor being further configured to:

obtain a first transfer function for the first high-frequency ultrasonic signal from an earpiece of the terminal to the first microphone according to the first high-frequency ultrasonic signal and the second high-frequency ultrasonic signal; and determine, according to the first transfer function, whether the posture with which the user holds the terminal during the call is the normal posture.

13. The apparatus of claim 12, wherein the processor is further configured to:

calculate a first similarity between the first transfer function and a transfer function corresponding to the normal posture; and determine that the posture with which the user holds the terminal during the call is not the normal posture when the first similarity is less than a first preset similarity.

14. The apparatus of claim 12, wherein the apparatus further comprises at least one second microphone, and the processor being further configured to:

obtain at least one second transfer function for the first high-frequency ultrasonic signal from the earpiece of the terminal to the at least one second microphone according to the first high-frequency ultrasonic signal and the second high-frequency ultrasonic signal;

calculate a first similarity between the first transfer function and a transfer function corresponding to the normal posture, and a second similarity between each of the at least one second transfer function and the transfer function corresponding to the normal posture to obtain at least one second similarity;

calculate a comprehensive similarity according to the first similarity and the at least one second similarity; and determine that the posture with which the user holds the terminal during the call is not the normal posture when the comprehensive similarity is less than a second preset similarity.

15. The apparatus of claim 12, wherein the processor is further configured to:

separately calculate a third similarity between the first transfer function and each transfer function in a transfer function set according to the first transfer function, the transfer function set storing a transfer function corresponding to each valgus angle at which the user holds the terminal during the call;

select a transfer function that has a largest third similarity with the first transfer function; and determine that a valgus angle corresponding to the selected transfer function comprises a valgus angle at which the user holds the terminal.

16. The apparatus of claim 9, wherein the processor is further configured to:

increase the multi-microphone noise-canceling sound pickup range of the terminal; or obtain a sound pickup range matching the valgus angle, and adjust the multi-microphone noise-canceling sound pickup range of the terminal to the sound pickup range matching the valgus angle.

* * * * *

UNITED STATES PATENT AND TRADEMARK OFFICE
CERTIFICATE OF CORRECTION

PATENT NO. : 10,148,801 B2  
APPLICATION NO. : 15/735895  
DATED : December 4, 2018  
INVENTOR(S) : Kaiyu Jiang Page 1 of 1

It is certified that error appears in the above-identified patent and that said Letters Patent is hereby corrected as shown below:

On the Title Page

Item (30), Line 1: "201510689091" should read "201510689091.9"

Page 2, Item (56), FOREIGN PATENT DOCUMENTS, Line 3: "2015154415" should read "2015154445"

In the Claims

Column 30, Line 36: insert --a-- after "comprising"

Signed and Sealed this  
Nineteenth Day of February, 2019

Andrei Iancu  
*Director of the United States Patent and Trademark Office*